US012652266B1

(12) United States Patent
Fregly et al.

(10) Patent No.: US 12,652,266 B1
(45) Date of Patent: Jun. 9, 2026

(54) METHODS AND SYSTEMS FOR DATA RETRIEVAL

(71) Applicant: VeriSign, Inc., Reston, VA (US)

(72) Inventors: Andrew Fregly, Reston, VA (US); Joseph Harvey, Clifton, VA (US); Burton S. Kaliski, Jr., McLean, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 17/827,576

(22) Filed: May 27, 2022

Related U.S. Application Data

(60) Provisional application No. 63/194,835, filed on May 28, 2021.

(51) Int. Cl.
| | |
|---|---|
| H04L 61/4511 | (2022.01) |
| H04L 9/40 | (2022.01) |
| H04L 61/58 | (2022.01) |
| H04L 69/164 | (2022.01) |

(52) U.S. Cl.
CPC .......... H04L 61/4511 (2022.05); H04L 61/58 (2022.05); H04L 63/0485 (2013.01); H04L 69/164 (2013.01)

(58) Field of Classification Search
CPC . H04L 61/4511; H04L 61/58; H04L 63/0485; H04L 69/164; H04L 61/5076; H04L 67/568
See application file for complete search history.

(56) References Cited

U.S. PATENT DOCUMENTS

| | | | | |
|---|---|---|---|---|
| 8,356,106 | B2 * | 1/2013 | Sood | H04L 61/4511 |
| | | | | 709/208 |
| 9,026,676 | B1 * | 5/2015 | Chen | G06F 15/16 |
| | | | | 709/245 |
| 9,300,560 | B2 * | 3/2016 | Leighton | H04L 61/4511 |
| 9,342,698 | B2 * | 5/2016 | McPherson | H04L 61/4511 |
| 9,467,461 | B2 * | 10/2016 | Balderas | H04L 63/1416 |
| 9,544,266 | B2 * | 1/2017 | Tuliani | H04L 63/12 |
| 9,887,956 | B2 * | 2/2018 | Akcin | H04L 61/58 |
| 9,906,488 | B2 * | 2/2018 | Kagan | H04L 61/302 |
| 10,044,629 | B1 * | 8/2018 | Raftery | H04L 47/70 |
| 10,158,620 | B2 * | 12/2018 | Smith | H04L 9/3247 |

(Continued)

FOREIGN PATENT DOCUMENTS

CN          112689030 A  *  4/2021

OTHER PUBLICATIONS

"Post-Quantum Cryptography PQC," (2021), 4 pages, https://csrc.nist.gov/projects/post-quantum-cryptography.

(Continued)

*Primary Examiner* — Alex Tran
(74) *Attorney, Agent, or Firm* — McCarter & English, LLP; Michael A. Sartori

(57) ABSTRACT
A method for use by a Domain Name System (DNS) resolver includes: obtaining a first identifier that the DNS resolver associates with cache data, the cache data comprising at least a portion of one or more DNS resource records; receiving or obtaining a second identifier that an DNS nameserver associates with current data; determining whether the first identifier corresponds to the second identifier; and performing an action to maintain or update the cache data based on whether the first identifier corresponds to the second identifier.

34 Claims, 17 Drawing Sheets

(56) References Cited

U.S. PATENT DOCUMENTS

| | | | | |
|---|---|---|---|---|
| 10,230,526 | B2 * | 3/2019 | Manning | H04L 9/3234 |
| 10,911,520 | B2 * | 2/2021 | Plamondon | H04L 67/56 |
| 11,025,482 | B2 * | 6/2021 | Huque | H04L 61/5076 |
| 11,082,394 | B2 * | 8/2021 | Maslak | H04L 67/1001 |
| 11,323,414 | B2 * | 5/2022 | Vavrusa | H04L 67/568 |
| 11,329,946 | B2 * | 5/2022 | Dupont | H04L 61/58 |
| 11,546,319 | B2 * | 1/2023 | Galvin | H04L 63/18 |
| 11,665,133 | B2 * | 5/2023 | Fieau | H04L 61/4511 |
| | | | | 709/245 |
| 2016/0028847 | A1 * | 1/2016 | Bradshaw | H04L 61/58 |
| | | | | 709/213 |
| 2018/0375716 | A1 * | 12/2018 | Huque | H04L 61/4511 |
| 2019/0253411 | A1 * | 8/2019 | Joyner | H04L 61/4511 |
| 2021/0266342 | A1 * | 8/2021 | Maslak | H04L 63/0281 |

OTHER PUBLICATIONS

Kazunori Fujiwara et al., "Fragmentation Avoidance in DNS draft-ieft-dnsop-avoid-fragmentation-01," (2020), 7 pages, https://tools.ietf.org/id/draft-ietf-dnsop-avoid-fragmentation-01.html#rfc.section.4.

Joao Damas et al., "Extension Mechanisms for DNS (EDNS(0))," (2013), 16 pages, https://datatracker.ietf.org/doc/html/rfc6891.

Shumon Huque et al., "Algorithm Negotiation in DNSSEC draft-huque-dnssec-alg-nego-03," (2018), 9 pages, https://tools.ietf.org/pdf/draft-huque-dnssec-alg-nego-03.pdf.

Amir Herzberg et al., "Less is More Cipher-Suite Negotiation for DNSSEC," (2014), 20 pages, https://www.acsac.org/2014/program-final/oc_multifile/3/195.pdf.

Steve Crocker et al., "Signaling Cryptographic Algorithm Understanding in DNS Security Extensions (DNSSEC)," (2013), 9 pages, https://datatracker.ietf.org/doc/html/rfc6975.

Paul Wouters et al., "The edns-tcp-keepalive EDNS0 Option," (2016), 11 pages, https://datatracker.ietf.org/doc/html/rfc7828.

"IPFS powers the Distributed Web," (2021), https://ipfs.io/.

Andrew Banks et al., "MQTT Message Queuing Telemetry Transport (MQTT)," (2021), 7 pages, https://en.wikipedia.org/wiki/MQTT.

"Public-key cryptography," (2021), 10 pages, https://en.wikipedia.org/wiki/Public-key_cryptography.

"DNSSEC," (2021), 3 pages, https://www.internetsociety.org/deploy360/dnssec/.

Roy Arends et al., "DNS Security Introduction and Requirements," (2005), 21 pages, https://datatracker.ietf.org/doc/html/rfc4033.

Roy Arends et al., "Resource Records for the DNS Security Extensions," (2005), 29 pages, https://tools.ietf.org/pdf/rfc4034.pdf.

Roy Arends et al., "Protocol Modifications for the DNS Security Extensions," (2005), 53 pages, https://datatracker.ietf.org/doc/html/rfc4035.

Olaf M. Kolkman et al., "DNSSEC Operational Practices, Version 2," (2012), 71 pages, https://datatracker.ietf.org/doc/html/rfc6781.

Paul Wouters et al., "Algorithm Implementation Requirements and Usage Guidance for DNSSEC," (2019), 11 pages, https://datatracker.ietf.org/doc/html/rfc8624.

Juan Benet et al., "DNSLink—linking content and services with DNS," (2021), 7 pages, https://dnslink.io/.

"IPFS DNSLink Concepts," (2021), 3 pages, https://docs.ipfs.io/concepts/dnslink/.

Luke Conway, "Blockchain Explained," (2020), https://www.investopedia.com/terms/b/blockchain.asp.

Donald E. Eastlake, 3rd., "Indirect KEY RRs in the Domain Name System (DNS)," (1999), 9 pages, https://datatracker.ietf.org/doc/html/draft-ietf-dnsind-indirect-key-00.

Roy Arends et al., "Resource Records for the DNS Security Extensions (see Table in A.1), " (2005), 29 pages, https://datatracker.ietf.org/doc/html/rfc4034#appendix-A.1.

\* cited by examiner

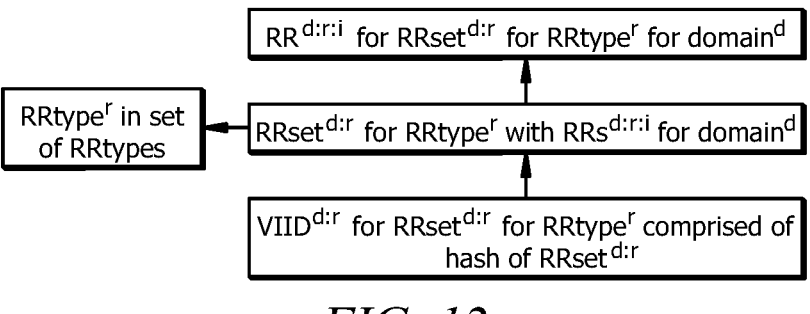

RR$^{d:r:i}$ for RRset$^{d:r}$ for RRtype$^r$ for domain$^d$

RRtype$^r$ in set of RRtypes

RRset$^{d:r}$ for RRtype$^r$ with RRs$^{d:r:i}$ for domain$^d$

VIID$^{d:r}$ for RRset$^{d:r}$ for RRtype$^r$ comprised of hash of RRset$^{d:r}$

*FIG. 12*

RR$^{d:r:i}$ for RRset$^{d:r}$ for RRtype$^r$ for domain$^d$

RRtype$^r$ in set of RRtypes

RRset$^{d:r}$ for RRtype$^r$ with RRs$^{d:r:i}$ for domain$^d$

RRSIG$^{d:r::k:a}$ on RRset$^{d:r}$ for RRtype$^r$ for algorithm$^a$ and DNSKEY$^{k:a}$ for domain$^d$ VIID$^{d:r}$ comprised of hash of all RRSIGs$^{d:r:k:a}$ for RRset$^{d:r}$ for RRtype$^r$ for domain$^d$ algorithm$^a$ in set of algorithm types DNSKEY$^{k:a}$ with keytag$^k$ and algorithm$^a$ keytag$^k$ for in set of keytags

*FIG. 13*

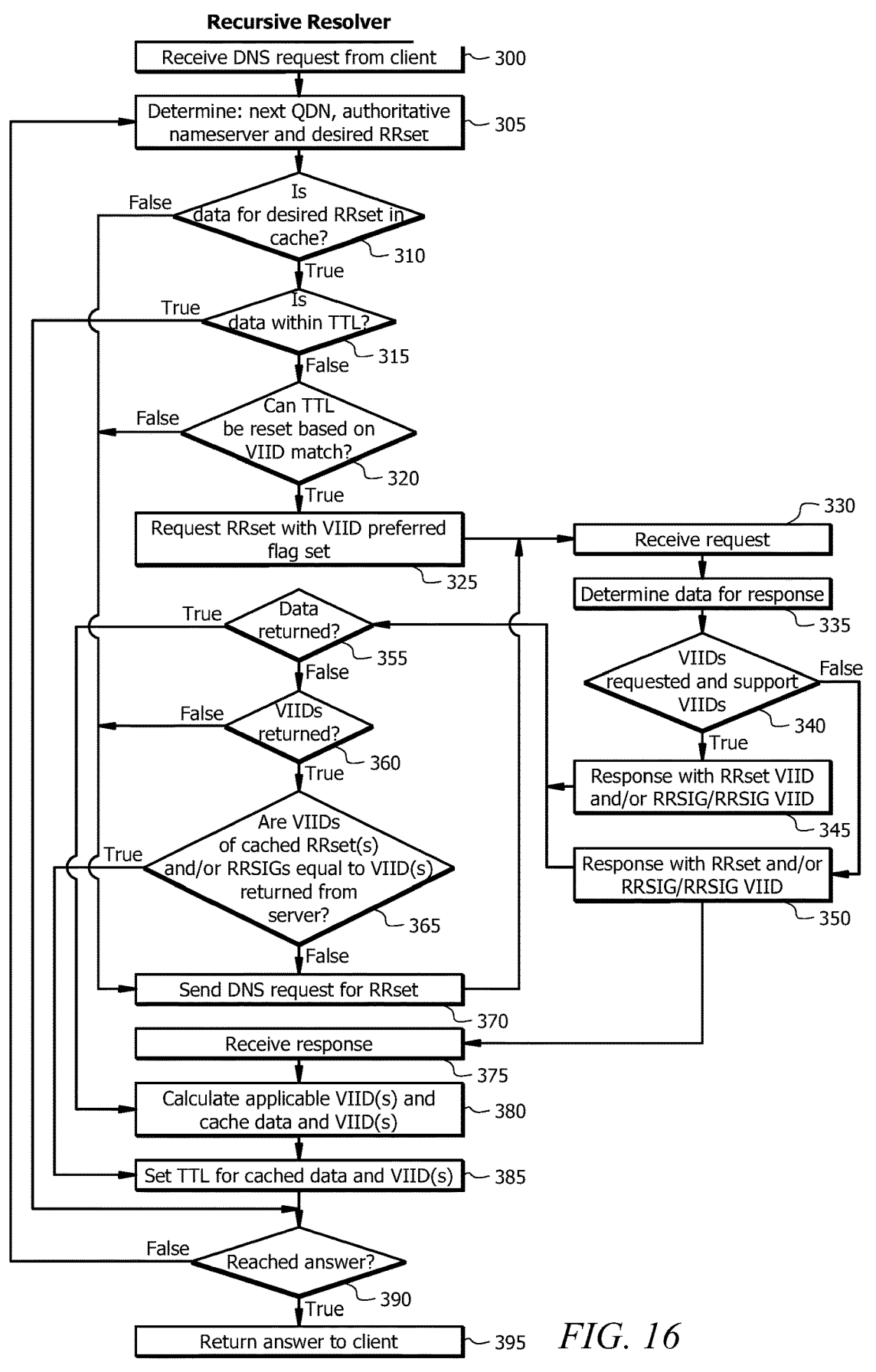

Recursive Resolver

Receive DNS request from client — 300

Determine: next QDN, authoritative nameserver and desired RRset — 305

Is data for desired RRset in cache? — 310
False
True

Is data within TTL? — 315
True
False

Can TTL be reset based on VIID match? — 320
False
True

Request RRset with VIID preferred flag set — 325

Receive request — 330

Determine data for response — 335

VIIDs requested and support VIIDs — 340
False
True

Response with RRset VIID and/or RRSIG/RRSIG VIID — 345

Response with RRset and/or RRSIG/RRSIG VIID — 350

Data returned? — 355
True
False

VIIDs returned? — 360
False
True

Are VIIDs of cached RRset(s) and/or RRSIGs equal to VIID(s) returned from server? — 365
True
False Send DNS request for RRset — 370

Receive response — 375

Calculate applicable VIID(s) and cache data and VIID(s) — 380

Set TTL for cached data and VIID(s) — 385

Reached answer? — 390
False
True

Return answer to client — 395

*FIG. 16*

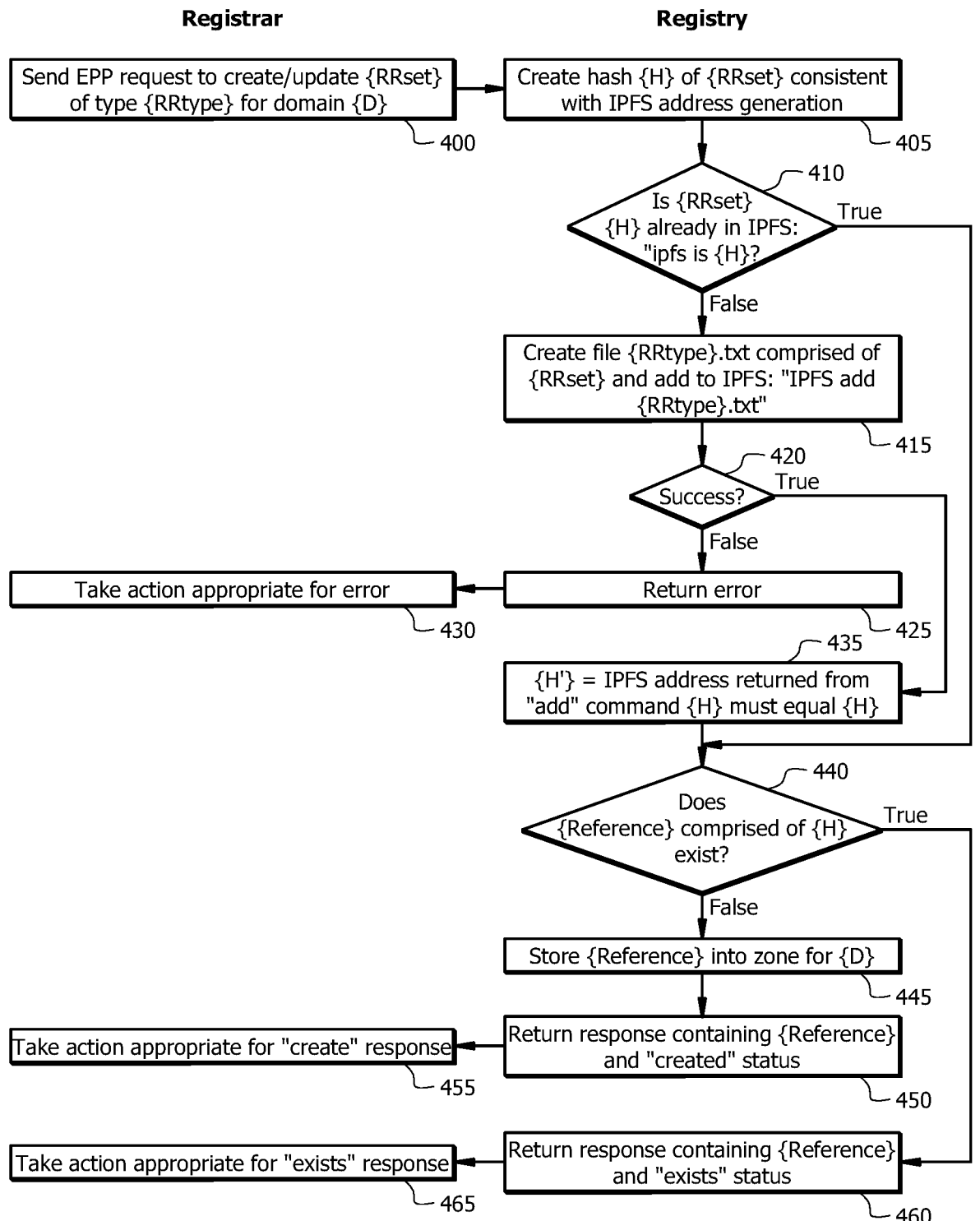

Registrar

Send EPP request to create/update {RRset} of type {RRtype} for domain {D}
— 400

Registry

Create hash {H} of {RRset} consistent with IPFS address generation
— 405

Is {RRset} {H} already in IPFS: "ipfs is {H}?
— 410
True
False

Create file {RRtype}.txt comprised of {RRset} and add to IPFS: "IPFS add {RRtype}.txt"
— 415

Success?
— 420
True
False

Take action appropriate for error
— 430

Return error
— 425

{H'} = IPFS address returned from "add" command {H} must equal {H}
— 435

Does {Reference} comprised of {H} exist?
— 440
True
False

Store {Reference} into zone for {D}
— 445

Take action appropriate for "create" response
— 455

Return response containing {Reference} and "created" status
— 450

Take action appropriate for "exists" response
— 465

Return response containing {Reference} and "exists" status
— 460

*FIG. 18*

METHODS AND SYSTEMS FOR DATA RETRIEVAL

PRIORITY CLAIM

The present application claims priority to U.S. Patent Application No. 63/194,835, filed May 28, 2021, entitled "Methods and Systems for Data Retrieval," which is incorporated by reference herein in its entirety.

TECHNICAL FIELD

Certain embodiments of the present disclosure relate, in general, to methods and systems for data retrieval, and in particular, for retrieval of DNS records.

BACKGROUND

In computing, a cache may comprise a hardware or software component that stores data so that future requests for that data can be served faster. For example, the data stored in a cache may be the result of an earlier computation or a copy of data stored elsewhere. Caches may be used in a variety of computer systems, such as in a distributed system that facilitates providing cached data to one or more computers via a network (e.g., a content distribution network, a domain name system (DNS) or name data networking variant, a database system, a registry system, etc.). As an example, a cache may be used in a DNS to store DNS records. A DNS allows people using the internet to refer to domain names, rather than Internet protocol (IP) addresses, when accessing websites and other online services. Domain names can include letters, numbers, and hyphens, which will often be easier to remember than IP addresses. In order to implement a DNS, a variety of top-level domains (TLDs) have been created. A generic top-level domain (gTLD) is one type of top-level domain used in DNS. Examples of gTLDs that have already been created are ".com," ".net," and ".org." Another type of TLD is a country-code top-level domain (ccTLD) such as, for example, ".uk." One or more second-level domains (SLDs) can be registered under a TLD. For example, an SLD of "verisign" could be registered under the TLD ".com" such that a website could be accessed at "verisign.com."

SUMMARY

According to certain embodiments, a method for use by a caching service comprises obtaining a first identifier that the caching service associates with cached data, receiving or obtaining a second identifier that an authoritative service associates with current data (the second identifier may be received from the authoritative service), and determining whether the first identifier corresponds to the second identifier. The method further comprises performing an action to maintain or update the cached data based on whether the first identifier corresponds to the second identifier.

According to certain embodiments, a method for use by an authoritative service comprises obtaining a first identifier that the authoritative service associates with current data, receiving or obtaining a second identifier that a caching service associates with cache data (the second identifier may be received from the caching service), and determining whether the first identifier corresponds to the second identifier. The method further comprises sending the caching service an indication to maintain or update the cache data based on whether the first identifier corresponds to the second identifier.

According to certain embodiments, a method for use by a caching service comprises sending a first request for a data object to an authoritative service, receiving a response from the authoritative service, the response comprising a reference to an out-of-band source from which to retrieve the data object, sending a second request for the data object to the out-of-band source, and receiving the data object from the out-of-band source.

According to certain embodiments, a method for use by an authoritative service comprises receiving a request for a data object from a caching service and facilitating out-of-band transfer of the data object to the caching service.

According to certain embodiments, a method for use by a caching service comprises sending a granular request for data. According to an embodiment, the granular request requests a portion of data comprising less than a full resource record (RR) set. According to another embodiment, the granular request requests a portion of data comprising more than the full RR set. The method further comprises receiving the portion of data.

According to certain embodiments, a method for use by an authoritative service comprises receiving a granular request for data from a caching service. According to an embodiment, the granular request requests a portion of data comprising less than a full resource record (RR) set. According to another embodiment, the granular request requests a portion of data comprising more than the full RR set. The method further comprises sending the caching service the portion of data or a reference to an out-of-band source from which to retrieve the portion of data.

According to certain embodiments, a method for use by a caching service comprises determining options available for reducing data transfer between the caching service and an authoritative service. The method further comprises using at least two of the options to reduce the data transfer between the caching service and the authoritative service.

According to certain embodiments, a method for use by an authoritative service comprises determining options available for reducing data transfer between the authoritative service and a caching service. The method further comprises using at least two of the options to reduce the data transfer between the authoritative service and the caching service.

According to certain embodiments, a computer-implemented method for use by a Domain Name System (DNS) resolver comprises obtaining a first identifier that the DNS resolver associates with cache data. The cache data comprises at least a portion of one or more DNS resource records. The method further comprises receiving or obtaining a second identifier that a DNS nameserver associates with current data, determining whether the first identifier corresponds to the second identifier, and performing an action to maintain or update the cache data based on whether the first identifier corresponds to the second identifier.

In certain embodiments, when the first identifier corresponds to the second identifier, the method performs the action to maintain the cache data. For example, the action to maintain the cache data comprises increasing a time-to-live associated with the cache data.

In certain embodiments, when the first identifier does not correspond to the second identifier, the method performs the action to update the cache data. For example, the action to update the cache data comprises receiving at least a portion of the current data. In certain embodiments, the at least a portion of the current data is received via an out-of-band data source. As an example, in certain embodiments, the second identifier comprises a reference to an out-of-band data source from which to receive the at least a portion of the current data, and the method receives the at least a portion of the current data from the out-of-band data source indicated by the reference. As another example, in certain embodiments, the at least a portion of the current data is received from an out-of-band data source indicated by a reference derived at least in part from the second identifier. In certain embodiments, at least a portion of the cache data is received from an out-of-band data source indicated by a reference derived at least in part from the first identifier.

In certain embodiments, the at least a portion of the current data is received in response to a granular request. The granular request indicates a requested subset of the current data.

In certain embodiments, the at least a portion of the current data is received via a connectionless protocol. As an example, in certain embodiments, the connectionless protocol is User Datagram Protocol (UDP).

In certain embodiments, the method determines whether the first identifier corresponds to the second identifier in response to an expiry associated with the first identifier or an expiry associated with the cache data.

In certain embodiments, the method determines whether the first identifier corresponds to the second identifier in response to a request from the DNS nameserver.

In certain embodiments, determining that the first identifier corresponds to the second identifier indicates that the cache data corresponds to the current data.

In certain embodiments, at least a portion of the one or more DNS resource records comprises information used for DNS Security Extensions (DNSSEC) validation. For example, in certain embodiments, the information used for DNSSEC validation comprises a key or a signature.

In certain embodiments, obtaining the first identifier comprises retrieving the first identifier from memory of the DNS resolver.

In certain embodiments, obtaining the first identifier comprises dynamically calculating the first identifier by the DNS resolver.

In certain embodiments, the first identifier is derived from the cache data and the second identifier is derived from the current data.

In certain embodiments, the first identifier comprises a hash of the cache data and the second identifier comprises a hash of the current data.

In certain embodiments, the first identifier comprises a subset of a hash of the cache data and the second identifier comprises a subset of a hash of the current data.

In certain embodiments, the first identifier comprises a subset of the cache data and the second identifier comprises a subset of the current data.

In certain embodiments, the first identifier and the second identifier are each managed by the DNS nameserver, wherein the first identifier is bound to the current data and the second identifier is bound to the cache data.

In certain embodiments, the DNS nameserver is configured to guarantee, confirm and/or validate that the first identifier is for the current data, and the DNS nameserver is configured to guarantee, confirm, and/or validate that the second identifier is for the cache data.

In certain embodiments, the first identifier is a first verifiable instance identifier (VIID) and the second identifier is a second VIID.

In certain embodiments, the method further comprise sending a first request for at least a portion of the current data to the DNS nameserver and receiving a response from the DNS nameserver. The response comprises a reference to an out-of-band source from which to retrieve the at least a portion of the current data. The method further comprises sending a second request for the at least a portion of the current data to the out-of-band source and receiving the at least a portion of the current data from the out-of-band source.

In certain embodiments, the method further comprises sending a granular request for data. The granular request requests a portion of the current data. The portion of the current data comprises less than a full resource record (RR) set. The method further comprises receiving the portion of the current data. As an example, in certain embodiments, the granular request indicates one or more requested RRs selected from the full RR set. As another example, in certain embodiments, the granular request indicates one or more requested elements of one or more RRs selected from the full RR set.

In certain embodiments, the second identifier is received from the DNS nameserver.

According to certain embodiments, a computer-implemented method for use by a Domain Name System (DNS) nameserver comprises obtaining a first identifier that the DNS nameserver associates with current data. The current data comprises at least a portion of one or more DNS resource records. The method further comprises receiving or obtaining a second identifier that a DNS resolver associates with cache data, determining whether the first identifier corresponds to the second identifier, and sending the DNS resolver an indication to maintain or update the cache data based on whether the first identifier corresponds to the second identifier.

In certain embodiments, when the first identifier corresponds to the second identifier, the method sends the indication to maintain the cache data, the indication indicating to increase a time-to-live associated with the cache data.

In certain embodiments, when the first identifier does not correspond to the second identifier, the method sends the DNS resolver the indication to update the cache data. The method further comprises sending at least a portion of the current data or a reference to at least a portion of the current data.

In certain embodiments, when the first identifier does not correspond to the second identifier, the method sends the DNS resolver the indication to update the cache data. The method further comprises sending the DNS resolver at least a portion of the current data via a connectionless protocol. For example, in certain embodiments, the connectionless protocol is User Datagram Protocol (UDP).

In certain embodiments, determining whether the first identifier corresponds to the second identifier is in response to a timer expiry.

In certain embodiments, determining whether the first identifier corresponds to the second identifier is in response to a request from the DNS resolver.

In certain embodiments, determining that the first identifier corresponds to the second identifier indicates that the current data corresponds to the cache data.

In certain embodiments, the at least a portion of the one or more DNS resource records comprises information used for DNS Security Extensions (DNSSEC) validation. For example, in certain embodiments, the information used for DNSSEC validation comprises a key or a signature.

In certain embodiments, obtaining the first identifier comprises retrieving the first identifier from memory of the DNS nameserver.

In certain embodiments, obtaining the first identifier comprises dynamically calculating the first identifier by the DNS nameserver.

In certain embodiments, the first identifier is derived from the current data and the second identifier is derived from the cache data.

In certain embodiments, the first identifier comprises a hash of the current data and the second identifier comprises a hash of the cache data.

In certain embodiments, the first identifier comprises a subset of a hash of the current data and the second identifier comprises a subset of a hash of the cache data.

In certain embodiments, the first identifier comprises a subset of the current data and the second identifier comprises a subset of the cache data.

In certain embodiments, the first identifier and the second identifier are each managed by the DNS nameserver.

In certain embodiments, the first identifier is a first verifiable instance identifier (VIID) and the second identifier is a second VIID.

In certain embodiments, the method further comprises receiving a request for at least a portion of the current data from the DNS resolver and facilitating out-of-band transfer of the at least a portion of the current data to the DNS resolver.

In certain embodiments, facilitating out-of-band transfer of the at least a portion of the current data is based at least in part on determining that a size of the at least a portion of the current data exceeds a threshold.

In certain embodiments, facilitating out-of-band transfer of the at least a portion of the current data comprises indicating, to the DNS resolver, a reference to an out-of-band source from which to retrieve at least a portion of the current data.

In certain embodiments, the first identifier comprises a reference to an out-of-band data source from which to receive at least a portion of the current data.

In certain embodiments, the method further comprises receiving a granular request for data from a DNS resolver. The granular request requests a portion of the current data comprising less than a full resource record (RR) set. The method further comprises sending the DNS resolver the portion of the current data or a reference to an out-of-band source from which to retrieve the portion of the current data.

In certain embodiments, the granular request indicates one or more requested RRs selected from the full RR set.

In certain embodiments, the granular request indicates one or more requested elements of one or more RRs selected from the full RR set.

In certain embodiments, the second identifier is received from the DNS resolver.

According to certain embodiments, a computer-implemented method for use by a Domain Name System (DNS) resolver comprise determining options available for reducing data transfer between the DNS resolver and a DNS nameserver. The method further comprises using at least two of the options to reduce the data transfer between the DNS resolver and the DNS nameserver.

In certain embodiments, at least one of the options comprises abstaining from a data transfer of current data when an identifier that the DNS resolver associates with cache data corresponds to an identifier that the DNS nameserver associates with the current data.

In certain embodiments, at least one of the options comprises requesting data using a granular request, wherein the granular request requests a portion of the data comprising less than a full resource record (RR) set.

In certain embodiments, at least one of the options comprises obtaining data via an out-of-band transfer between the DNS resolver and an out-of-band source distinct from the DNS nameserver.

In certain embodiments, the method further comprises sending the DNS nameserver information indicating the options supported by the DNS resolver. The at least two of the options used to reduce the data transfer between the DNS resolver and the DNS nameserver are selected by the DNS nameserver based on the information indicating the options supported by the DNS resolver.

In certain embodiments, the information indicating the options supported by the DNS resolver further indicates a prioritization of the options.

According to certain embodiments, a computer-implemented method for use by a Domain Name System (DNS) nameserver comprises determining options available for reducing data transfer between the DNS nameserver and a DNS resolver. The method further comprises using at least two of the options to reduce the data transfer between the DNS nameserver and the DNS resolver.

In certain embodiments, at least one of the options comprises abstaining from a data transfer of current data when an identifier that the DNS resolver associates with cache data corresponds to an identifier that the DNS nameserver associates with the current data.

In certain embodiments, at least one of the options comprises receiving a granular request for data and providing a response. The granular request requests a portion of the data comprising less than a full resource record (RR) set, and the response comprises the portion of data indicated in the granular request. Thus, the response comprises less than the full RR set.

In certain embodiments, at least one of the options comprises indicating to the DNS resolver to obtain data via an out-of-band transfer between the DNS resolver and an out-of-band source distinct from the DNS nameserver.

In certain embodiments, the method further comprises receiving, from the DNS resolver, information indicating the options supported by the DNS resolver. The method further comprises selecting the at least two of the options used to reduce the data transfer between the DNS resolver and the DNS nameserver based on the information indicating the options supported by the DNS resolver. In certain embodiments, the information indicating the options supported by the DNS resolver further indicates a prioritization of the options, and selecting the at least two of the options used to reduce the data transfer between the DNS resolver and the DNS nameserver is based at least in part on the prioritization of the options.

According to certain embodiments, an apparatus comprises one or more processors and one or more non-transitory computer-readable media storing instructions that, when executed by the one or more processors, cause the apparatus to perform any of the methods described above.

According to certain embodiments, a system comprises one or more processors and one or more non-transitory computer-readable media storing instructions that, when executed by the one or more processors, cause the one or more processors to perform any of the methods described above.

According to certain embodiments, one or more non-transitory computer-readable media store instructions that, when executed by one or more processors, cause the performance of any of the methods described above.

Some embodiments of the disclosure may provide one or more technical advantages. As an example of a technical advantage, certain embodiments facilitate increasing the size of cached records communicated via a network without adding undue overhead (e.g., network overhead, processing overhead, and cache management overhead). In addition, or in the alternative, certain embodiments facilitate increasing the size of cached records communicated via a network in a manner that avoids unneeded cache refreshes (e.g., in the DNS context, the frequency of cache updates on resolvers may be minimized). Certain embodiments optimize retrieval of cached data by determining whether cached data is current based on an identifier associated with the cached data; retrieving large data objects out-of-band; and/or granular requests and responses for cached data (e.g., requests for a portion of a record or a record set, rather than the full record set).

As another example of a technical advantage, certain embodiments facilitate increasing security by supporting post-quantum public key algorithm that yield large cached records (e.g., post-quantum public key algorithms may cause key sizes and/or signature sizes to increase). Certain embodiments reduce costs and performance detriments that adoption of post-quantum cryptography would otherwise have on protocols or methods for authenticating and/or securing DNS response data, such as DNS Security Extensions (DNSSEC). Certain embodiments support the continued use of DNSSEC after the adoption of post-quantum cryptographic algorithms by minimizing the negative impacts of their adoption related to computing and network resource requirements. For example, certain embodiments minimize the impact on nameservers of responding to requests for large DNS data objects, in particular, large DNSKEY and/or RRSIGs due to post-quantum public key algorithm adoption in DNSSEC. Such embodiments may reduce the need for multi-part UDP messaging and/or use of TCP, TLS and other high overhead transports. A technical advantage of certain embodiments includes maintaining the utility of UDP as the primary transport for DNS requests and responses, even when the requests are for large DNS data objects. A technical advantage of certain embodiments includes improving reliability and/or reducing costs for transfer of large cache records or data objects, such as post-quantum DNSKEY and/or RRSIG RRs.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 12 illustrates an example of non-DNSSEC Verifiable Instance Identifiers (VIIDs) for $domain^d$ at RRset and RRSIG signature level, in accordance with certain embodiments.

FIG. 13 illustrates an example of VIIDs for $domain^d$ for DNSSEC signed zone where a hash of RRSIGs on RRset serves as VIID, in accordance with certain embodiments.

FIG. 16 illustrates an example of a basic DNS embodiment of VIID usage to optimize caching, in accordance with certain embodiments.

FIG. 18 illustrates an example of out-of-band IPFS registration, in accordance with certain embodiments.

DETAILED DESCRIPTION

Figure 1:
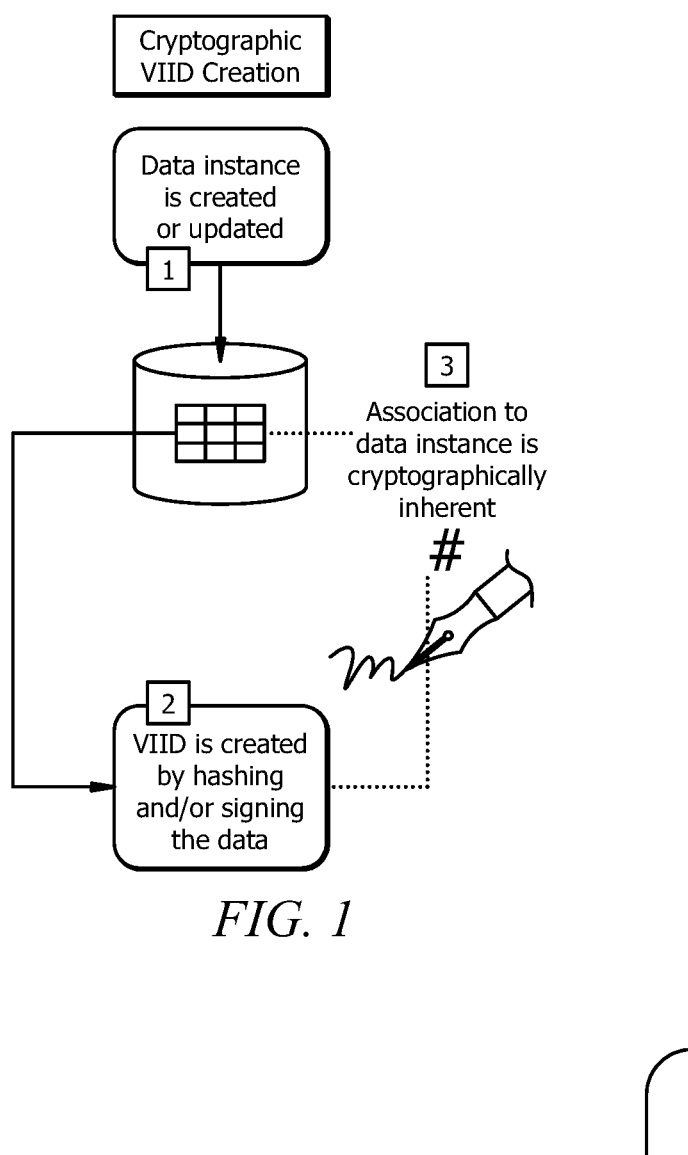
FIG. 1 illustrates an example of generating an identifier associated with cacheable data, in accordance with certain embodiments.

Embodiments of the present invention are described in FIGS. 1-20 of the drawings, like numerals being used for like and corresponding parts of the various drawings.

Overview

The DNS is a globally distributed registry for data records associated with domain names. These records are retrievable by client applications that use standard application programming interfaces (APIs) to query DNS resolvers that manage the resolution of the queries. DNS resolvers, sometimes referred to as recursive resolvers, then fulfill queries by interacting with a hierarchically related set of authoritative nameservers that contain the DNS data that is retrievable by DNS queries. The hierarchy of authoritative nameservers maps onto the structure of segmented elements (labels) in a fully qualified domain name (FQDN). A FQDN is a unique global identifier with its labels informing how the fully qualified domain name can be processed to retrieve records associated with the FQDN. Going from right to left, labels in an FQDN are delimited as the text between the "."

characters. Each label can be thought of as subset (subdomain) of the label to the right of it. The hierarchy includes delegation points where authority for subdomains is delegated from one nameserver to another. The portion of the hierarchy for which a nameserver has authority (and from which it may delegate authority to others) is referred to as a zone within DNS nomenclature. The rightmost element of a FQDN is an implicit "." that is not normally included in the FQDN. This rightmost "." is referred to as the "root" of the DNS hierarchy and the zone of domains for labels immediately to the left of the root "." is referred to as the "root zone."

Resolvers perform resolution of FQDNs by iteratively querying nameservers that are authoritative for the zones identified by the labels in an FQDN. In an illustrative embodiment that has different authoritative nameservers for each zone corresponding to a label, this is performed as follows. The iterative queries start with a query to the authoritative nameserver for the root zone which responds with the identity of the authoritative nameserver for the zone identified by the leftmost label, then the authoritative nameserver for the zone identified by the leftmost label responds with the identity of the authoritative nameserver for the zone identified by the second to the leftmost label, with this model of querying authoritative nameservers for the zone for the next to the left label continuing, following DNS delegation points (which may in some cases cover more than one level) until the authoritative nameserver for the zone containing the leftmost label returns the queried for records associated with the FQDN.

The above described iterative querying of authoritative nameservers is actually not commonly fully performed as DNS has been optimized by having resolvers cache much of the information that is being queried for. These caches will almost always contain desired DNS records from the root zone and the zones for leftmost label below it, the TLDs, plus records for popular names within the zones managed by the authoritative nameservers for the TLDs. Resolvers will first use cached records during recursive processing and will only query authoritative nameservers if desired records are not in cache or the records are no longer valid due to being expired by time-to-live (TTL) constraints on the cached records. This approach works well for DNS but also introduces needs related to optimizing cache management so that the overhead of unneeded refreshes of caches are eliminated and the processing and network impact of cache management are minimized.

Currently almost all DNS responses fit with typical user datagram protocol (UDP) maximum transmission units (MTUs), and DNS caching allows resolvers to cache much of the information that is being queried for.

Experts in the field of quantum computing and public key cryptography have provided guidance indicating quantum computers capable of breaking current public key algorithms will be available within 20 years. This implies that within five to ten years, DNS security extensions (DNSSEC) will need to deprecate the currently used public key algorithms and adopt quantum-safe digital signature algorithms, such as post-quantum cryptographic (PQC) algorithms.

Many of the post-quantum algorithms currently under consideration would cause DNSSEC related responses to be too large to conform to the size constraints of existing UDP MTUs (e.g., UDP MTUs are commonly 1500 bytes or less). For example, due to large key and/or digital signature sizes of these algorithms, it is anticipated that future DNSSEC related responses containing certain resource records (RRs), such as records containing keys (e.g., DNSKEY) and/or records containing signatures (e.g., RRSIG), will not fit within typical UDP MTUs. Thus, it is anticipated that adopting post-quantum algorithms will have a negative impact on the current use of UDP as the prevalent transport for data returned by authoritative nameservers to resolvers. Accommodating large responses may require a workaround, such as fragmenting the results in order to fit within the size constraints of UDP MTUs or upgrading to another transport, such as transmission control protocol (TCP) or transport layer security (TLS), with all the costs and complexities these work-arounds may entail. Both of these work-arounds would increase server processing load, require increased bandwidth, and in the case of fragmented responses increase the likelihood to transmission errors.

What is therefore needed are DNS and DNSSEC enhancements that reduce the impact of larger responses (e.g., larger keys and/or signatures). For DNSSEC and distributed registry and database systems that serve up large data objects, an optimized caching mechanism that minimizes the frequency of cache updating is desirable. This would lower the processing and network loads for both the cache and for the authoritative nameservers that provide data that is cached.

A more generalized version of this problem applies to other forms of distributed caches such as content distribution networks, name data networking variants and other database and registry systems that rely on distributed caching services that interact with authoritative servers that are sources for the current version of data and tightly bound identifiers. In these systems, particularly ones that deliver large data objects that are subject to change, a method is needed for optimizing the distributed caching so that cache refreshes are minimized.

Certain embodiments of the present disclosure may provide a solution to the above-described problems. For example, certain embodiments use the following approaches individually, or in combination of any two or three of the approaches, to minimize over-the-wire transfer of large DNS responses from DNS nameservers:

1. Optimized resolver and client caching so as to minimize over-the-wire transfer of large data.

As an example, certain embodiments introduce the use of small Verifiable Instance Identifiers (VIIDs) which identify cached data instances and authoritative data instances. The need for a cache refresh is determined based on transferring one or more VIIDs between caching services and authoritative servers and doing comparisons of one or more VIIDs to determine whether or not cached data is current. Cached data is then only retrieved and/or refreshed if the comparison indicates the cached data is stale. When cached data does not need to be refreshed, certain embodiments provide for automatic TTL extension for cached data.

2. Use out-of-band retrieval for large data so as to avoid the need for the nameserver to provide large data via the usual protocol for interacting with the server, and instead shift the burden to other servers and/or protocols that may be better optimized for this purpose.

As an example, out-of-band data transfer eases load on the nameserver by allowing the nameserver to respond to requests for large data objects with references that allow the data to be retrieved out-of-band from external services or via a lower impact method from the nameserver.

3. Add granularity to the DNS protocol so as to be able to request and respond with individual RRs.

As an example, a granular request and response mechanism allows for requests for data at a more granular level than a full RRset, resulting in smaller responses containing just the requested RRs or even just elements of RRs.

Certain embodiments maintain backward compatibility with current DNS protocols and/or DNSSEC protocols. For example, the signaling mechanisms for requests and responses for DNS can be configured to support backward compatibility and discretionary use of the specific elements disclosed herein. Generalized versions of the solutions apply to other forms of distributed caches such as content distribution networks, name data networking variants and other database and registry systems that rely on distributed caching services that interact with authoritative servers that are sources for the current version of data and tightly bound identifiers. According to an embodiment, the bound identifier may include a hash of the data, a digital signature on the data, a hash of a signature, a signature on a hash, an extract, a compression, and/or other identifier that is derived from the data which the identifier identifies. According to an embodiment, the bound identifier may include an identifier that is managed by a source and which is bound to a specific instance. For example, the identifier is tightly bound if the source guarantees that the identifier is for the specific instance.

As indicated above, certain embodiments introduce an identifier (such as, for example, a VIID), that can facilitate minimizing over-the-wire transfer of large data. Certain embodiments cache data (cacheable data, such as a key, signature, etc.) along with an identifier (e.g., VIID) that is tightly bound to the cacheable data. Caching of the data and the identifier may be performed as part of the same process or as separate processes in response to requests that indicate which may be returned. During query processing and when the identifier or data in cache is expired, the resolver will query an authoritative server for the identifier that is bound to the desired data. If the identifier returned from the authoritative server corresponds to the cached identifier, the corresponding data is returned to the client and the TTL is reset to a renewed validity period for the data. In some examples, correspondence between the identifier returned from the authoritative server and the cached identifier can include an exact match between the identifier returned from the authoritative server and the cached identifier. In some examples, correspondence between the identifier returned from the authoritative server and the cached identifier can include correspondence (or match) between derivatives of the identifiers, such as a hash or similar. In some examples, correspondence between the identifier returned from the authoritative server and the cached identifier can include a pre-defined correspondence (or match) between the identifiers, such as with a correspondence table, a correspondence identifier embedded with the identifiers, or similar. In some embodiments where data is retrieved and cached separately, the caching system may retrieve and cache data from an authoritative server on an as-needed basis. If the identifiers do not correspond to or the data is not in cache, a query for the desired data is sent to the authoritative server and if found on the authoritative server, the data and its current tightly bound identifier are then cached and a TTL is set on the cached data and tightly bound identifier so that they are not marked as expired.

The bound identifiers can be in at least the following forms:

Form 1: a hash of the data.

Form 2: a subset of the hash of the data where the subset is of sufficient length to provide a desirable level of assurance of consistency of the cached data.

Form 3: a subset of the data of sufficient length to provide a desirable level of assurance of consistency with the cached data. For example, for a large digital signature, the first 10% of the signature.

Form 4: an identifier managed by the authoritative server that is trusted to represent the current valid version of the data. For instance, in a document management system, the document identifier and version number.

Unique identifiers in forms 1-3 discussed above (e.g., hash: subset of hash; subset of data) may be particularly applicable to DNSSEC-related DNSKEY and RRSIG records that will grow significantly in size due to adoption of any of the post-quantum public key algorithms under consideration for standardization by the U.S. National Institute of Standards and Technology (NIST). These larger records will result in DNS responses that exceed the MTUs for the UDP transport. The consequence of this is that UDP would no longer work well for transport of responses containing DNSKEY and/or RRSIG records. This may drive a shift to alternative transports such as TCP or TLS which could increase operational costs for DNS and degrade DNS performance.

A decision to use partial signatures or partial data as identifiers has considerations that need to be taken into account. The principal security and operational concern is that the cache may not be refreshed in a timely manner due to a partial ID collision on versions of a data record. To remediate this concern, the certain embodiments include at least one or more of the following features:

1. A "maximum TTL" may be used to force a refresh at some longer interval than the normal TTL. This remediates the impact of the cache not being current by ensuring that it is refreshed at some maximum time interval that is acceptable from operational and security perspectives.

2. Another mechanism configures a flag that forces a cache refresh and retrieval of current data from an authoritative server. In determining how long to set the max TTL or when to use the flag for a forced refresh, consideration would be made relative to the impact of delivering stale data.

3. Another mechanism modifies data in some inconsequential way when a new partial ID for it collides with a previous partial ID. Then a partial ID generated based on the data modified with this process may be repeated as necessary until a unique partial ID is created.

There are, proposed herein, various embodiments which address one or more of the issues disclosed herein. An embodiment "1" comprises at least one or more of the following elements for DNSSEC relative to DNSKEY queries.

1. A new record type would be used to contain hashes of public keys found in DNSKEY records. For purposes of example and explanation, certain embodiments refer to the new record type as "HDNSKEY." These records could contain a complete hash of the public key per identifier (form 1 discussed above) or a subset of the hash per identifier (form 2 discussed above).

2. Queries to authoritative nameservers for DNSKEY records in their zone would result in a return of matching DNSKEY records and their corresponding HDNSKEY records.

3. Queries for HDNSKEY records would only return the matching HDNSKEY records.

4. Resolvers receiving DNSKEY queries will check their cache to see if valid non-expired DNSKEY records are in cache and if so, return those records in the DNS response. If DNSKEY records are not found in the cache, resolvers would send a DNSKEY request to the authoritative nameserver for the FQDN and for resolvable queries, receive and cache the DNSKEY records and HDNSKEY records found in the response. In situations where the resolver finds the desired DNSKEY records in cache, but the records are expired, the resolver will do as follows. First, it will query the authoritative nameserver for the HDNSKEY records corresponding to the desired DNSKEY records. On receiving back HDNSKEY records in the response, the resolver will compare the HDNSKEY values to HDNSKEY values found for the queried domain in the resolver cache. For HDNSKEYs that correspond (or match), the resolver will update the TTL for the HDNSKEY records and corresponding DNSKEY records so that they are no longer expired and return the corresponding DNSKEY in the response to the client. For HDNSKEYs that do not correspond (or match), the resolver will perform processing as though the DNSKEY and HDNSKEY records were not found in cache.

In an embodiment "2," a process similar to embodiment "1" may be used for records that contain, for example, a portion of the public keys found in DNSKEY records. For purposes of example and explanation, certain embodiments refer to records that contain a portion of the public keys found in DNSKEY records as "SDNSKEY." In this embodiment, the SDNSKEY caching, comparisons and lookups are performed consistent with how they are done for HDNSKEY records in embodiment "1."

In an embodiment "3," a process similar to embodiment "1" may be used for HRRSIG that contain, for example, hashes of RRSIG records (or a portion of hashes of RRSIG records) or for SRRSIG records that contain a portion of RRSIG signatures. for example, this embodiment applies in cases where RRSIGs would normally be returned in a DNS response from an authoritative nameserver. In the case where HRRSIG/SRRSIG records are found relative to a queried for domain and the resolver has indicated via a query flag that they accept HRRSIG/SRRSIG records, the HRRSIG/SRRSIG records would be returned in the response rather than RRSIG records. Also, when a resolver does not find HRRSIG records in cache and/or RRSIG records, or these records are expired, the resolver would set a flag on the query requesting that both HRRSIG and RRSIG records be returned in the response. Processing relative to assessing the HRRSIG/SRRSIG records and the interaction flow with the authoritative nameserver based on the assessment would be similar to that done in embodiment "1."

In an embodiment "4," applicable, for example, to DNS and DNSSEC, query flags are used as an alternative to introducing new resource record types into DNSSEC as described in embodiments "1" through "3." For instance, a HDNSKEY flag could be used as follows. A resolver would set the HDNSKEY flag to indicate the authoritative nameserver should perform the following processing. When the "HDNSKEY" flag is set, the authoritative nameserver would return only DNSKEY records with a new "hashed public key" signature algorithm type. The value of the public key would be the hash of the underlying public key type and value. In general, the hash input may include both the underlying public key value and the type of the underlying public key, to ensure separation between equal values of different types, which may be applicable to the HDNSKEY and HRRSIG. This could be a special case of previous "DNSSEC algorithm negotiation" proposals, and the flag could also specify a combination of hashed and a specific underlying type, e.g., "Do you have any hashed RSA keys?". This approach anticipates the possibility that a zone has DNSSEC public keys of multiple PQC types for compatibility with different resolvers, so consequently a resolver may want to ask for keys of one or more specific PQC types. Adding this algorithm selection capability for requests with the HDNSKEY flag extends this concept to cover the HDNSKEY flag. This capability would allow resolvers to make a single DNSKEY query, and assign highest priority to the hashed form of its preferred PQC type. Similarly, DNSSEC-OK queries could include a flag that hashed RRSIGs are preferred.

In an embodiment "5," a more generalized embodiment applies to distributed caching systems where cached data needs to be checked for freshness and refreshed when it is not fresh. In this case, identifiers of form 1 through form 4 could be used to uniquely identify versions of cached data. Clients interacting with the data caches or data caching services would perform interactions using these identifiers similar to how the identifiers in embodiments 1 through 4 are used to check to see if cached data is fresh and to refresh it when it is determined not to be fresh.

Embodiments "1" through "5," may be varied in any suitable manner, for example:

1. Instead of caching the identifiers, they could be dynamically calculated by the client or cache management software and the calculated identifiers used in comparison with identifiers retrieved from the authoritative data sources.

2. Query flags such as those used in the embodiment "3" and "4" could be used broadly by clients to indicate caching client and resolver support of the identifier and data return options when interacting with the authoritative data sources. The use of flags would support backward compatibility as the interactions would conform to prior interaction models when the flag(s) are not set.

3. Some embodiments would be applicable to distributed data stores that separate the data objects from the registry/database that is used for data object lookups. This would be applicable to: storing large DNS-related records outside DNS based on TBD extensions of DNS: blockchain data object registries: Digital Object Architecture; and similar distributed data registries. Such embodiments could use existing identifiers for referencing data such as identifiers based on uniform resource identifiers (URIs), a domain name (optionally with reference to a specific record type at that domain name): the original DNS record: for a public key, a public key fingerprint (e.g., a short sequence of bytes used to identify a longer public key, which may be created by applying a cryptographic hash function to a public key): or an issuer/serial number combination from a public-key infrastructure.

Certain embodiments propose solutions that use signaling to affect DNS caching mechanisms and/or use of hashes as tightly bound identifiers that are cached and are used in optimizing caching algorithms.

According to certain embodiments, a computer-implemented method for minimizing size of DNSSEC-related response data comprises receiving, from a DNS resolver, a DNS query indicating one or more response options for minimizing response size. The method further comprises preparing a response comprising the response data, the response prepared according to at least one of the one or more response options, and providing the response to the DNS resolver. In certain embodiments, at least one of the one or more response options indicates data that can be used to determine if cached data is current, data that serves as a reference to be used for out-of-band retrieval of referenced data, or that the response data need only include a subset of data that would otherwise have been returned if the indicator was not present. In certain embodiments, the DNS query indicates at least two response options.

According to certain embodiments, a computer-implemented method for optimizing DNS response caching comprises receiving, from a DNS resolver, a DNS query using an EDNS(0) flag or other DNS request data to indicate verifiable instance identifiers are to be used to support determination of whether or not resolver's cached DNS data is current. The method further comprises comparing a verifiable identifier associated with a cached data instance to a verifiable identifier associated with the current data instance to determine if cached data is current. The method further comprises providing an indicator that the time-to-live for cached data can be updated when cached data is current or providing the current data instance or a reference to the current data instance if cached data is not current.

ADDITIONAL EXAMPLES

As discussed above, work is underway to develop PQC algorithms. For example, NIST notes that some engineers predict in 20 years or so sufficiently large quantum computers may break the public key algorithms currently in use in DNSSEC. New PQC algorithms will be adopted to address the vulnerability of current public key algorithms. The PQC algorithms may create issues for DNSSEC as responses containing keys and/or signatures may exceed prevalent UDP MTU sizes. For example, various UDP MTU sizes have been described for DNS, and commonly the UDP MTU size is less than or equal to 1500 bytes (the 1500-byte size requires use of "Extension Mechanisms for DNS (EDNS (0))." What is needed are enhancements to DNS and DNSSEC to minimize the impact larger keys and/or signatures will have on DNSSEC.

Certain options for accommodating larger keys and/or signatures include using TCP as DNS Transport as a fallback for handling DNS queries and responses that exceed UDP MTUs: using DNS over DTLS: using DNS over TLS (DOT) as replacement for or complement to DNSSEC to handle larger queries and responses: using DNS over HTTP (DoH) to provide DNS resolution at the application layer while gaining benefits of the underlying transport (TCP and TLS): or using DNS over QUIC (DoQ), which inherits the benefits QUIC brings to UDP such as reliable transport, multiplexing, and persistent connections. However, these options may introduce certain tradeoffs, such as increased latency: increased overhead of connection setup and teardown: increased data transmission due to protocol overheads: increased security overheads (such as security overheads associated with DoT or DoQ) that may override relative benefit, particularly between recursive resolvers and authoritative nameservers when qname minimization is used; inability of encrypted transports to defend against server compromise and cache poisoning; and/or lack of legacy device and resolver support.

Certain embodiments of the present disclosure may provide solutions to these and other problems. Certain embodiments improve DNS resolver caching to significantly reduce the transfer of large DNS data records. Certain embodiments include an identifier, such as a VIID, VIIDs that can be verifiably associated with data instances. As an example, a cryptographic VIID may comprise a hash of an RRset. As another example, a label VIID may comprise a domain name, RRtype, and time stamp for an RRset. In certain embodiments, cache services (e.g., caching DNS recursive resolvers or caching DNS clients) or authoritative servers (e.g., authoritative DNS nameservers) can compare VIIDs to determine if cached data is current. VIID verification is based on trust that the authoritative server is authoritative for data instances and their VIIDs. Data validation may be based on cryptographic validation using cryptographic elements of a VIID or based on a secure interaction with an authoritative server.

To support the use of VIIDs, certain embodiments provide DNS protocol extensions. The DNS protocol extensions facilitate VIID exchange between caching services and authoritative servers. In certain embodiments, the DNS protocol extensions build on DNS and DNSSEC algorithm negotiation concepts, or the DNS protocol extensions could be based on new DNS request types. As an example, a DNS protocol extension may provide for automatic TTL extension when VIID comparison indicates cached data is current. As another example, a DNS protocol extension may facilitate shortcut DNSSEC validation when VIIDs correspond (or match).

Certain embodiments describe signaling and reference mechanisms to allow a DNS nameserver to indicate a client should perform out-of-band retrieval of large DNS data records via TCP, TLS, HyperText Transfer Protocol (HTTP), InterPlanetary File System (IPFS, which may provide a peer-to-peer protocol and network that certain embodiments may use for out-of-band retrieval of large DNS data records), Message Queuing Telemetry Transport (MQTT), or other protocols. Out-of-band data may be provided by authoritative DNS nameservers or other sources. This could provide a secure and reliable method for minimizing the impact of large record retrieval from DNS authoritative servers.

Certain embodiments describe protocols or methods for granular DNS requests and query responses. For example, certain embodiments allow a client to decide what response sections they want, what records or data elements they want in response sections, and what RRSIGs they want in responses. Certain embodiments build on general DNS and DNSSEC algorithm negotiation concepts (see e.g., IETF Draft—Algorithm Negotiation in DNSSEC: Less is More Cipher-Suite Negotiation for DNSSEC: RFC 6975—Signaling Cryptographic Algorithm Understanding in DNS Security Extensions (DNSSEC); and RFC 7828—The edns-tcp-keepalive EDNS0 Option, which build on DNS capabilities such as EDNS(0)). VIIDs and out-of-band retrieval may be used within these protocols to optimize caching and lesson the load on nameservers.

Cache Optimization

Certain embodiments comprise caching optimizations for minimizing the transfer of large data objects between authoritative servers and caching services. The premise of the optimizations is that cache refreshes can be minimized by first checking to see if cached data corresponds to (or matches) the current data on an authoritative server. The optimization compares VIIDs for authoritative server data with VIIDs for cached data to determine whether or not cached data is current.

With respect to VIID creation and trust, certain embodiments include a mechanism to provide trust that a VIID is a valid data instance identifier. As an example, a cryptographic VIID may be cryptographically derived from data and trusted based on cryptographic verification mechanisms. As another example, a hash is verifiable based on a VIID recipient doing their own hash of the data and comparing it to a received hash. As another example, a cryptographic digital signature is trusted based on trust in the PKI that provides public keys used to verify signatures. A cryptographic VIID can be used to verify data provided via untrusted transports and/or from untrusted sources. FIG. 1 illustrates an example of cryptographic VIID generation, in accordance with certain embodiments.

Figure 2:
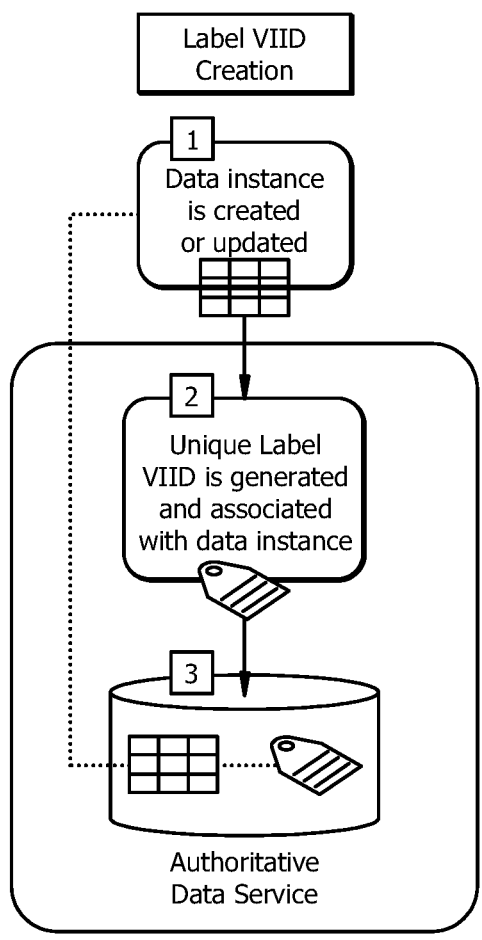
FIG. 2 illustrates another example of generating an identifier associated with cacheable data, in accordance with certain embodiments.

VIIDs that are not cryptographically derived, referred herein as Label VIIDs, are subject to the following properties. First, a label VIID will typically be a unique identifier assigned to a data instance by an authoritative source. Second, a label VIID may comprise an arbitrary unique identifier and/or version number and/or timestamp. Third, a label VIID may comprise a derivation of a data instance, perhaps combined with some other identifier, so long as the Label VIID is assured to be a unique identifier. The entity that generates Label VIIDs for some data corpus verifies that each generated Label VIID is unique over some defined lifetime and is a persistent identifier for the data instance to which it applies. The methods of sending and receiving Label VIIDs must be trusted as a Label VIID is trusted based on authenticating the source that provides the Label VIID and ensuring that the Label VIID was not modified or replaced while in transit. Methods such as secure connections over TLS may be used for this purpose. FIG. 2 illustrates an example of label VIID generation, in accordance with certain embodiments.

Various use cases may use cryptographic VIIDs in cache optimization. Cryptographic VIIDs are amenable to use cases that do not provide a trusted transport. Lightweight transports such as UDP are used in situations where minimal latency and maximum transmission speed are desired. Because cryptographic VIIDs are cryptographically verifiable relative to the data instance to which they apply, caching services can check the validity of VIIDs relative to data instances they already have. In an embodiment of a cache check use case, a non-correspondence (or mismatch) between a compromised authoritative server supplied VIID and a cached VIID would result in a request for current data from the authoritative server by a caching service. In some use cases where VIIDs would need to be frequently changed, the overhead of generating VIIDs and the protocol overhead for using VIIDs for cache checking may exceed the desired benefits. Good fits for Cryptographic VIIDs include DNS, streaming multi-media, and possibly named data networking (NDN) and content distribution networks.

Various use cases may use label VIIDs in cache optimization. Label VIIDs are amenable to use cases where the caching service trusts the authenticity of the authoritative server, trusts the transport mechanism, and authoritative servers can guarantee the uniqueness of VIIDs and their association with specific data instances. TLS provides a trusted transport for TCP that includes verification of server identity. Label VIIDs are likely low overhead to create and store as existing version identifiers managed by a server may be reusable as VIIDs. Good fits for Label VIIDs are interactions between caching services and Web Services over TLS and TCP. For example: interactions between a client application and a content management system.

The following summarizes aspects of using a VIID for caching optimization, in accordance with certain embodiments. VIID creation involves the process of generating a VIID that serves as a unique identifier for a data instance.

VIIDs support determining whether or not cached data is the same as the data instance managed by an authoritative server. A VIID may be retrieved from an authoritative server and compared to the VIID for cached data. A VIID for cached data may be provided to an authoritative server for it to compare to the VIID for a data instance managed by the authoritative source. VIIDs comprised of a data hash may be dynamically generated by both the authoritative server and a caching service. In certain embodiments, pre-generation and storage of VIIDs for as-needed use may be preferred to dynamic VIID generation, for example, in instances where a VIID is likely to be accessed multiple times and storage is not an issue. A caching service may use a cryptographic VIID from an authoritative server to identify data to retrieve from a non-authoritative source and to verify that data.

Figure 3:
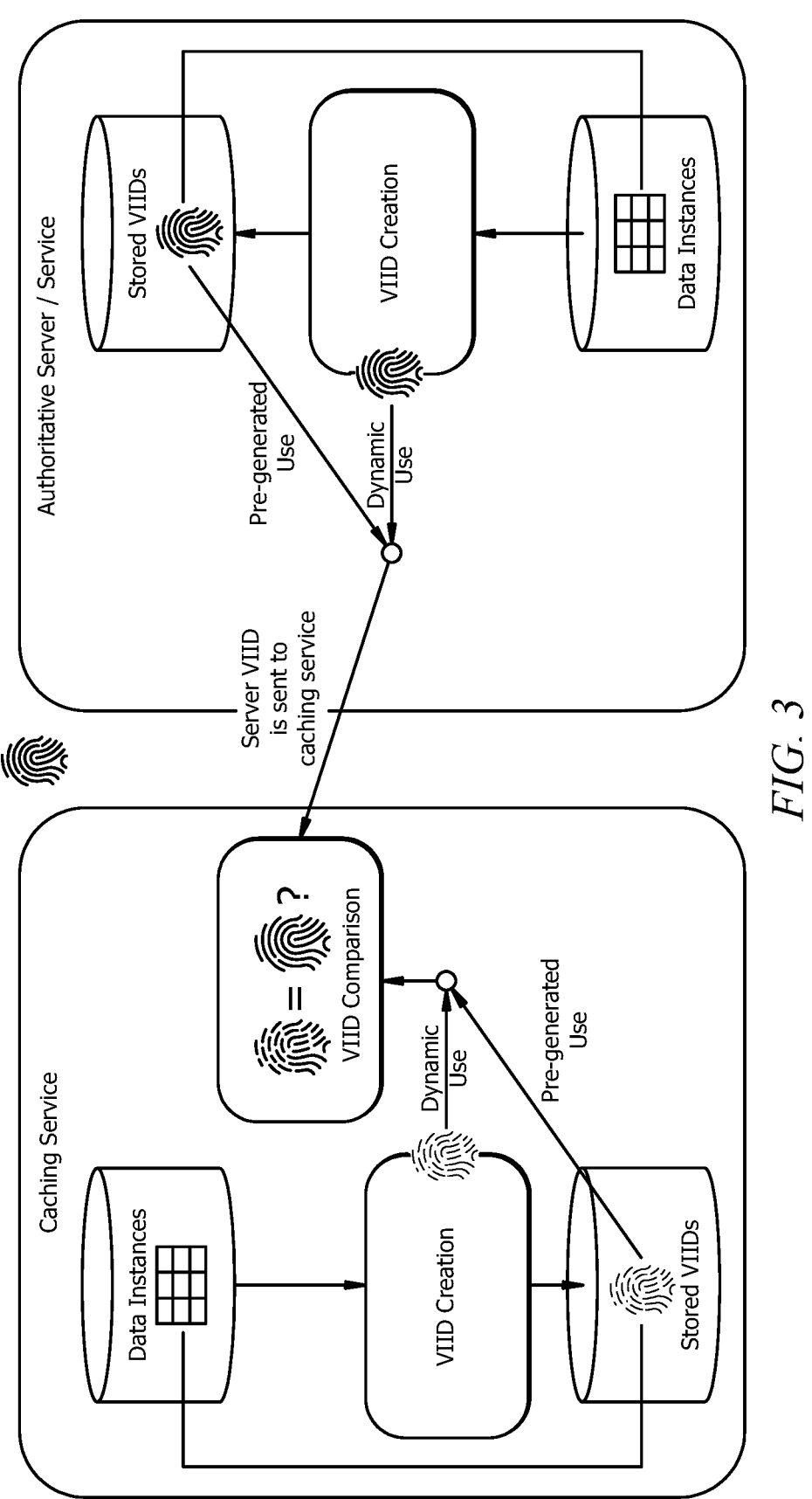
FIG. 3 illustrates an example of a cache-side comparison of an identifier associated with cacheable data, in accordance with certain embodiments.
Figure 4:
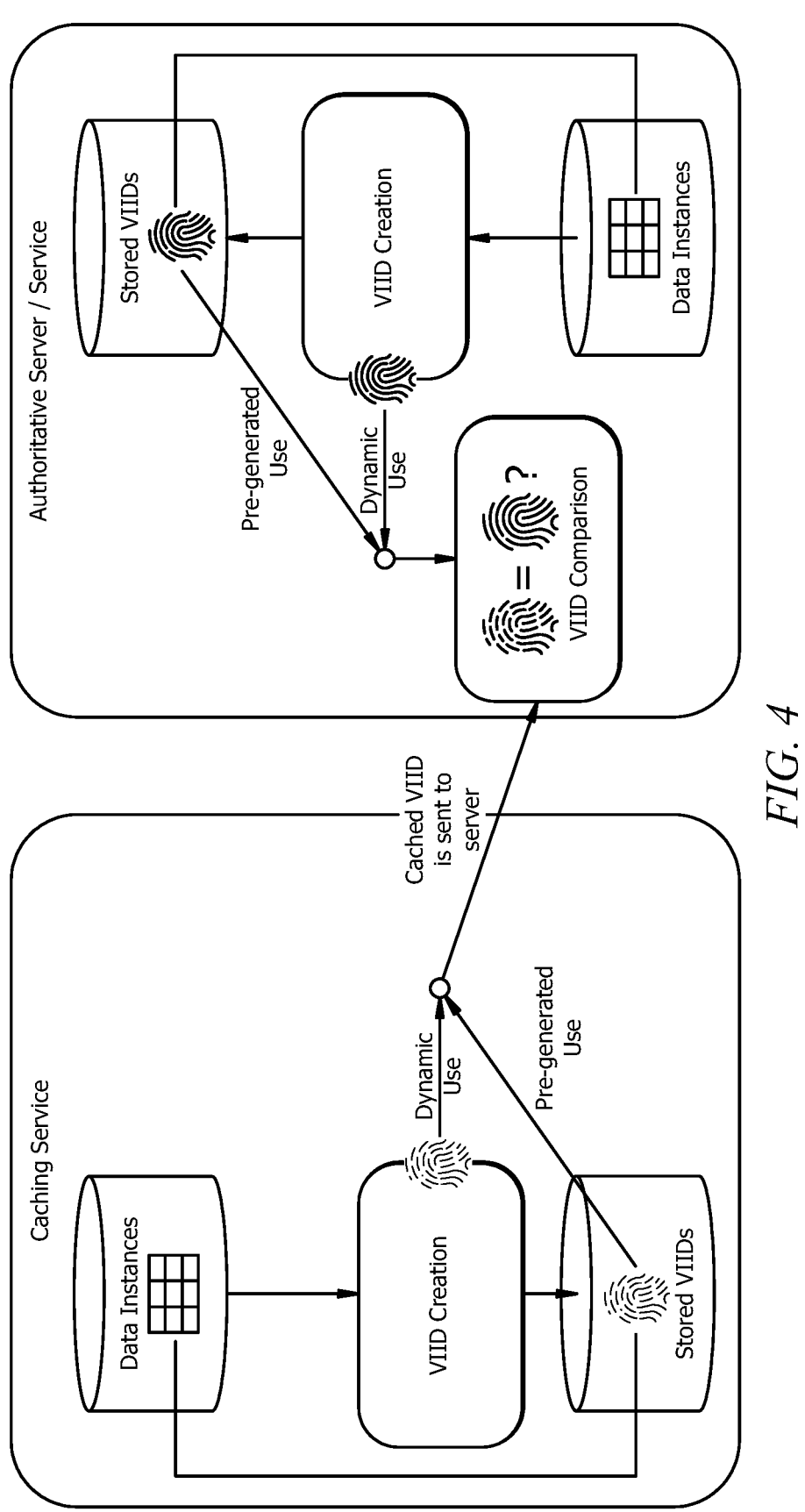
FIG. 4 illustrates an example of a server-side comparison of an identifier associated with cacheable data, in accordance with certain embodiments.
Figure 5:
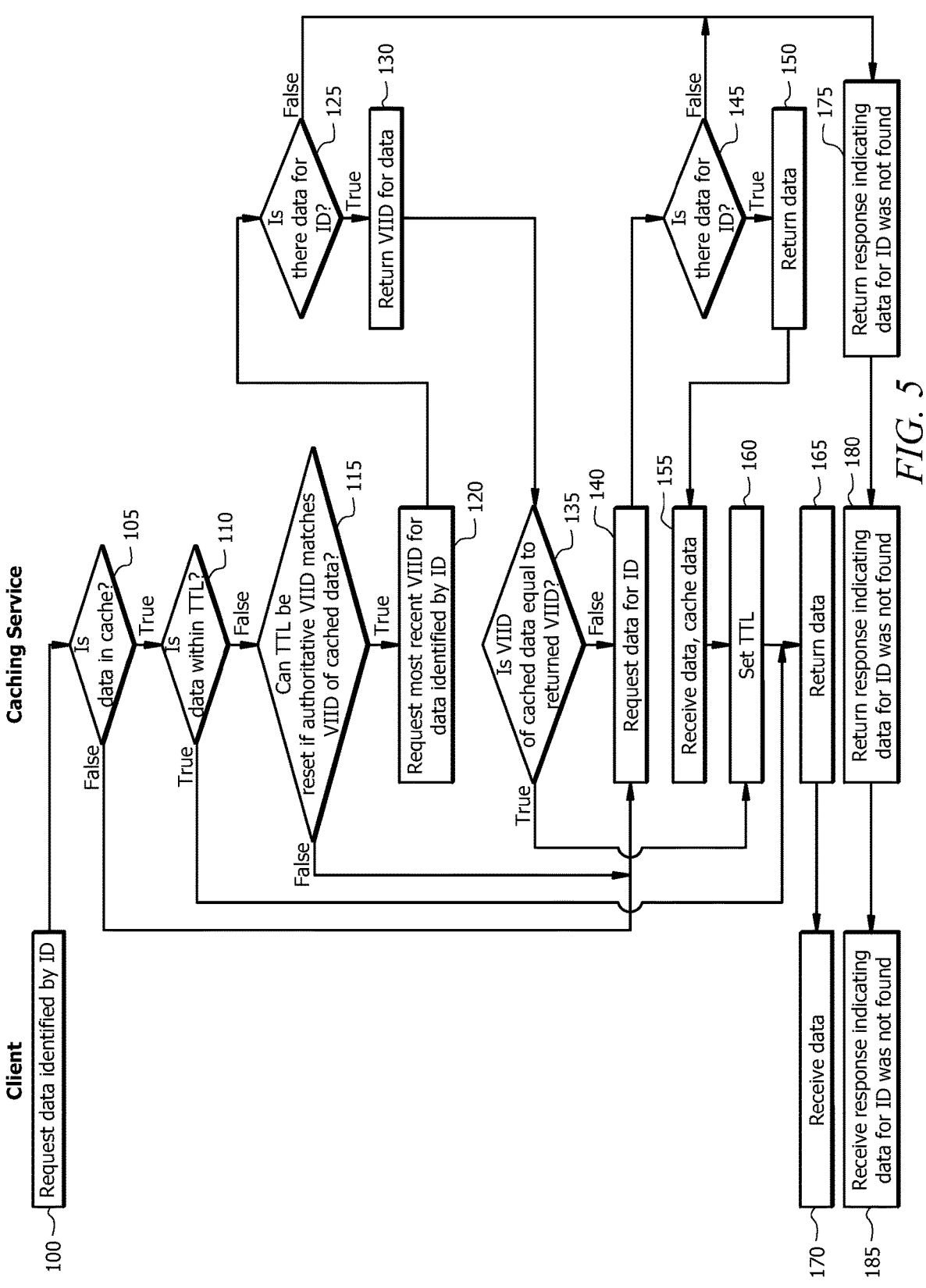
FIG. 5 illustrates an example of a method for a cache-side comparison of an identifier associated with cacheable data, in accordance with certain embodiments.
Figure 6:
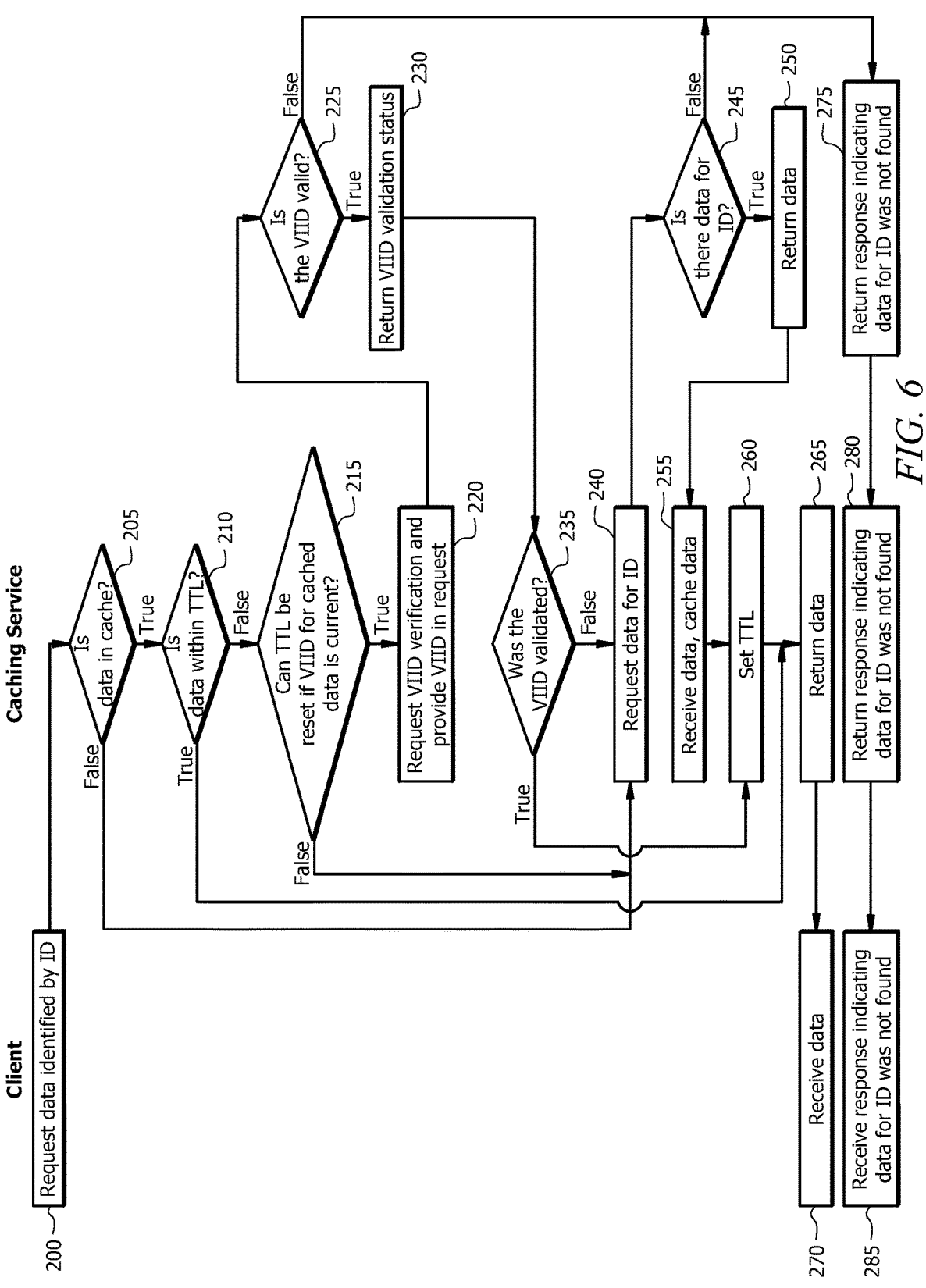
FIG. 6 illustrates an example of a method for a server-side comparison of an identifier associated with cacheable data, in accordance with certain embodiments.

FIGS. 3-6 illustrate examples of systems and methods for using VIIDs to verify whether or not cached data is current. In particular, FIG. 3 illustrates an example of cache-side VIID comparison, in accordance with certain embodiments. FIG. 5 illustrates an example of a method for cache-side VIID comparison, in accordance with certain embodiments. In certain embodiments, the method of FIG. 5 may be performed by one or more components illustrated in FIG. 3. FIG. 4 illustrates an example of server-side VIID comparison, in accordance with certain embodiments. FIG. 6 illustrates an example of a method for server-side VIID comparison, in accordance with certain embodiments. In certain embodiments, the method of FIG. 6 may be performed by one or more components illustrated in FIG. 4.

Certain embodiments use one of the above-described methods to generate and verify the VIID used in FIGS. 3-6.

With respect to FIG. 5 (cache-side VIID comparison), at step 120, a signaling protocol may be used to indicate VIID optimization is supported or requested. A caching service could use capability signaling in a request to indicate that it will accept a VIID in the response rather than the data. For DNS caching resolvers, this could build on mechanisms described in, e.g., IETF Draft—Algorithm Negotiation in DNSSEC: Less is More Cipher-Suite Negotiation for DNSSEC: RFC 6975-Signaling Cryptographic Algorithm Understanding in DNS Security Extensions (DNSSEC): or RFC 7828—The edns-tcp-keepalive EDNS0 Option, which build on DNS capabilities such as EDNS(0). A caching service may explicitly request VIIDs via a request parameter.

At step 120, several mechanisms could be used as sources for caching service VIIDs. As a first example, a caching service may have received a VIID from a server at the time cached data was retrieved and stored it in the cache in association with the data. As a second example, a caching service may dynamically calculate a VIID for currently cached data. As a third example, a caching service may use an out-of-band process to generate VIIDs and store them in the cache in association with the cached data to which they apply. In the second and third examples, for embodiments using DNS, the server may determine data that corresponds to the VIID based on ID information (e.g., domain name) and RR type. For other types of services, the server would need sufficient information to identify the current instance that is being checked.

At step 130, several mechanisms could be used as sources for server-side VIIDs. As an example, a server may have previously generated a VIID for the data and stored it in association with the data. As another example, a server may dynamically calculate a VIID for current data. At step 130, several alternatives could apply to the return of VIIDs and/or data associated with a requested VIID. As an example, a server may supply the requested VIID if the data identified in the request is on the server. As another example, a server may return data rather than a VIID if the server does not support VIIDs. As another example, a server may return an indicator that the server does not support VIIDs.

At step 135, any of the mechanisms described for step 120 could be used as sources for the cached VIID to be compared to the VIID received from the server.

At step 140, a caching service may want to get a VIID returned along with the requested data. The caching service could use a signaling capability to indicate they would like a VIID returned along with the data.

At step 150, an authoritative server may utilize several mechanisms that determine whether or not it returns a VIID along with the requested data. A signal in the data request may indicate to the authoritative server that the caching service wants a VIID to be returned along with the data. The protocol used for retrieving data may prescribe that an authoritative server always returns a VIID along with the data. The protocol used for retrieving data may allow an authoritative server discretion in deciding whether or not to return a VIID along with the data.

At step 155 and other steps where data is returned to a caching service, caching service may generate a VIID for the data and cache the VIID in association with the data.

At step 160, extension of TTLs may be subject to some maximum so as to periodically force cache refreshes.

Turning to FIG. 6 (server-side VIID comparison), at step 220, a new type of DNS query may be used to support providing a VIID to a nameserver. In some embodiments, capability signaling could be used to determine whether or not a server supports server-side VIID comparison. For DNS, this could build on mechanisms like those described above with respect to FIG. 5 (step 120).

At step 220, several mechanisms could be used as sources for caching service VIIDs. As an example, a caching service may have received a VIID from an authoritative server at the time cached data was retrieved and store it in the cache in association with the data. As another example, a caching service may dynamically calculate a VIID for currently cached data. As another example, a caching service may use an out-of-band process to generate VIIDs and store them in the cache in association with the cached data to which they apply.

At step 225, several mechanisms could be used as sources for authoritative server-side VIIDs used for comparison to caching service supplied VIIDs. As an example, an authoritative server may have previously generated a VIID for the data and have that stored in association with the data. As another example, an authoritative server may dynamically calculate a VIID for current data.

At step 230, several alternatives could apply to the return of VIIDs and/or data associated with a requested VIID. A client may have signaled that it would accept a data instance in a response if the cached VIID was not valid. If the supplied cached VIID is not valid, the authoritative server might supply the current data instance or a pointer to the data instance in the response. An authoritative server may return an indicator that the server does not support VIIDs.

At step 240, a caching service may want to get a VIID returned along with the requested data. The caching service could use a signaling capability to indicate it would like a VIID returned along with the data. A caching service may use a cryptographic VIID received from an authoritative server to retrieve data from other sources and verify the data cryptographically using the VIID.

At step 250, an authoritative server may return a VIID along with the requested data. A signal in the data request may indicate to the server that the caching service wants a VIID to be returned along with the data. The protocol used for retrieving data may prescribe that an authoritative server always returns a VIID along with the data. The protocol used for retrieving data may allow an authoritative server discretion in deciding whether or not to return a VIID along with the data.

At step 255 and other steps where data is returned to a caching service, it may generate a VIID for the data and cache the VIID in association with the data.

At step 260, extension of TTLs may be subject to some maximum so as to periodically force cache refreshes.

Figure 7:
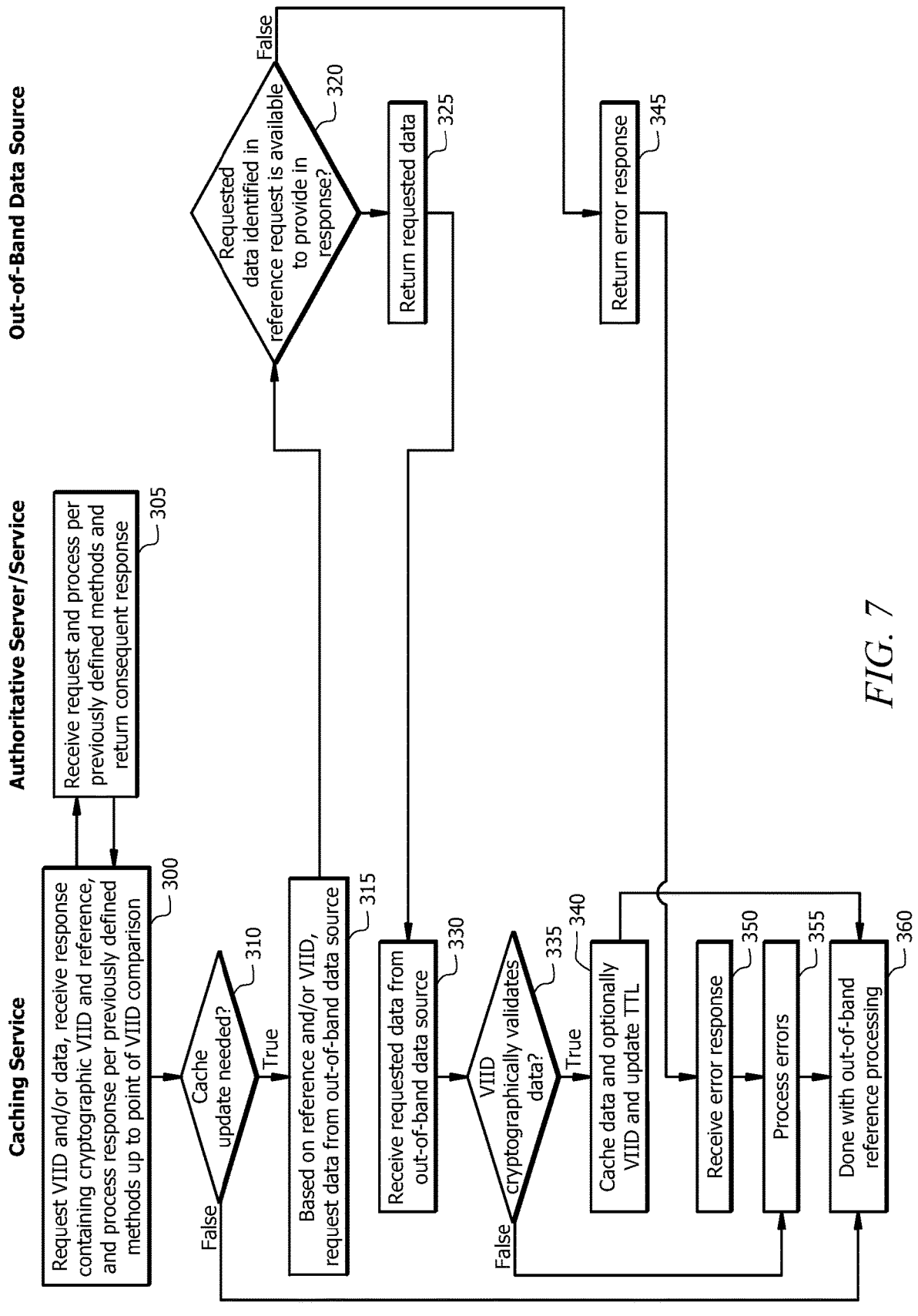
FIG. 7 illustrates an example embodiment for out-of-band data retrieval by a caching service using a cryptographic identifier for data validation, in accordance with certain embodiments.

FIG. 7 illustrates an example embodiment for out-of-band data retrieval by a caching service using a cryptographic VIID for data validation, in accordance with certain embodiments. At step 305, a reference may be comprised of just a VIID or may be comprised of a VIID and an identifier for an out-of-band data source. When just a VIID is provided in the reference, the caching service may use the VIID as an identifier in a request to an out-band data source of its choosing, as shown in step 315. For example, a VIID comprised of an IPFS address or a blockchain block hash serves as an identifier for data associated with the VIID and allows for cryptographic verification of that data. In another example, a caching service may request the data from other local services it believes may have the data.

At step 310, in this embodiment and other embodiments where a decision is being made about whether a cache update is needed, a cache update may be needed even though the VIID for the data on the caching service was current. For example, this may be due to the caching service having purged data for reasons such as limited cache data storage.

At step 315, the request made based on the reference may or may not incorporate a VIID. As noted for step 305, in some cases a data identifier may be comprised of a VIID.

At step 330, a VIID may be calculated for received data and validation of the data would require the calculated VIID to correspond to (or match) the VIID received from the Authoritative Server/Service.

At step 335, optionally, the VIID for the data may or may not be cached in association with the data. Also at step 335, a caching service may cache or record non-VIID reference data for future use such as identifying preferred Out-of-Band Data Sources.

At step 335, the TTL for cached data and/or VIIDs may be reset or extended.

Certain embodiments may be implemented in the context of DNS. Such embodiments may improve caching and minimize transfer of DNS data too large to transport via the preferred UDP transport. Specifically, certain embodiments will minimize transfers of large public keys and/or digital signatures due to DNSSEC PQC digital signature algorithms.

Certain DNS embodiments are backward compatible with existing DNS protocols. Thus, certain embodiments add to the current DNS protocol without interfering with the capability of legacy resolvers and authoritative servers (e.g., resolvers and nameservers that predate the use of described embodiments and/or resolvers and nameservers that do not support the described embodiments) to interact according to current DNS protocol. Signaling mechanisms such as EDNS (0) or new DNS record types in the additional section of responses may be used to indicate these DNS protocol additions. Other additive signaling mechanisms may be used.

Certain embodiments optimize DNS caching by applying one or more methods disclosed herein to DNS data and VIIDs associated with the data. For purposes of example and explanation, certain embodiments focus on recursive resolver (resolver) and authoritative nameserver (nameserver) interactions. However, analogous embodiments are more generally applicable to DNS interactions between any type of DNS client and a DNS resolution service a DNS client considers to be authoritative or other DNS data source for which VIIDs are verifiably associated with DNS data.

Basic embodiments are described relative to DNS caching typically performed by resolvers which cache some or all of the following: DNS RRsets and DNSSEC RRSIGs. Other embodiments apply to other levels of DNS data granularity.

Some embodiments use a signaling protocol to indicate an interaction. Other embodiments may use specific DNS request types to indicate an interaction.

Requests and responses may use an indicator that VIIDs are included. A VIID may also be self-evident and serve as the indicator.

Some embodiments use cryptographic VIIDs. Other embodiments use label VIIDs.

In some embodiments, a resolver may use the methods disclosed herein on VIIDs and data provided by a nameserver. In some embodiments, a resolver may provide VIIDs to a nameserver to determine whether or not provided VIIDs apply to current DNS data.

DNSSEC embodiments may use hashes off RRset data, RRSIGs, and/or hashes of RRSIGs as VIIDs for RRsets.

Granular embodiments use VIIDs for DNS data at a different granularity than RRsets. Granular embodiments may use VIIDs for individual resource records (RRs) or elements of RRs such as the public key in a DNSKEY RR or signature from an RRSIG RR. Embodiments may have VIIDs apply to data elements from multiple RRs. For instance, a VIID comprised of a hash of a combination of DNSKEY public keys and all RRSIG signatures for a particular public key algorithm type. In these embodiments, the granularity of cached data may differ from the granularity of data a VIID is applicable to so long as cached data elements are associated with the VIID such that methods disclosed herein can be applied to them.

In some embodiments, a start of authority (SOA) record may serve as a VIID for DNS records for which the SOA record is applicable. For example, the VIID could comprise the serial number in the SOA record, which indicates the version of the zone file containing the records.

Some embodiments describe mechanisms for out-of-band retrieval for large DNS responses. In some embodiments, this data is stored in services external to the DNS nameservers and DNS nameserver responses supply references for retrieving the data. Certain embodiments apply the method disclosed herein to minimize out-of-band data retrievals. In some embodiments, the identifier for out-of-band data may be comprised of a cryptographic VIID for the out-of-band data and the VIID may be used to validate the data when the data is retrieved out-of-band. In cases where DNSSEC validation is performed and VIIDs are comprised of RRSIGs or hashes of RRSIGs, VIID validation is inherently performed by DNSSEC validation.

Certain embodiments extend the usage of DNS TTLs for cached data by allowing resolvers to extend TTLs based on a VIID comparison indicating cached data is current. In some embodiments, an expiration date and time may be used to indicate that TTLs should not be extended past the indicated date and time. In some DNSSEC embodiments, the expiration date and time may be provided in a DNSKEY record.

In some embodiments, a resolver or DNS client may use a VIID considered current according to methods disclosed herein to identify and retrieve DNS data from non-authoritative sources. Cryptographic VIIDs in these embodiments may be used to validate retrieved data.

Depicted embodiments focus on a single DNS query and response interaction. Those with ordinary skill in the art may apply the methods of the embodiments to the various interactions required for recursive DNS resolution and DNSSEC validation.

Certain embodiments may be implemented in the context of DNSSEC. For example, given that a goal of certain embodiments is to optimize DNS caching to address a future post-quantum DNSSEC, a high level description of DNSSEC is provided herein. DNSSEC encompasses elements of DNS that ensure the legitimacy of data returned in response to DNS requests. DNSSEC relies on methods of Public Key Cryptography as its basis for verification. The data back-end of DNSSEC is comprised of DNSKEY records containing public keys, RRSIG records containing cryptographic signatures on RRsets, and DS records containing a hash of KSKs for subzones. RRSIGs are verified using public keys found in DNSKEY records where each DNSKEY is associated with a domain name (representing a zone of authority) for which its signature is valid on RRsets under the domain name. As examples, further overview of DNSSEC may be found in a number of IETF RFCs, such as RFC 4033, RFC 4034, RFC 4035, RFC 6781, and RFC 8624, however, the present disclosure is not limited to these RFCs.

Figure 8:
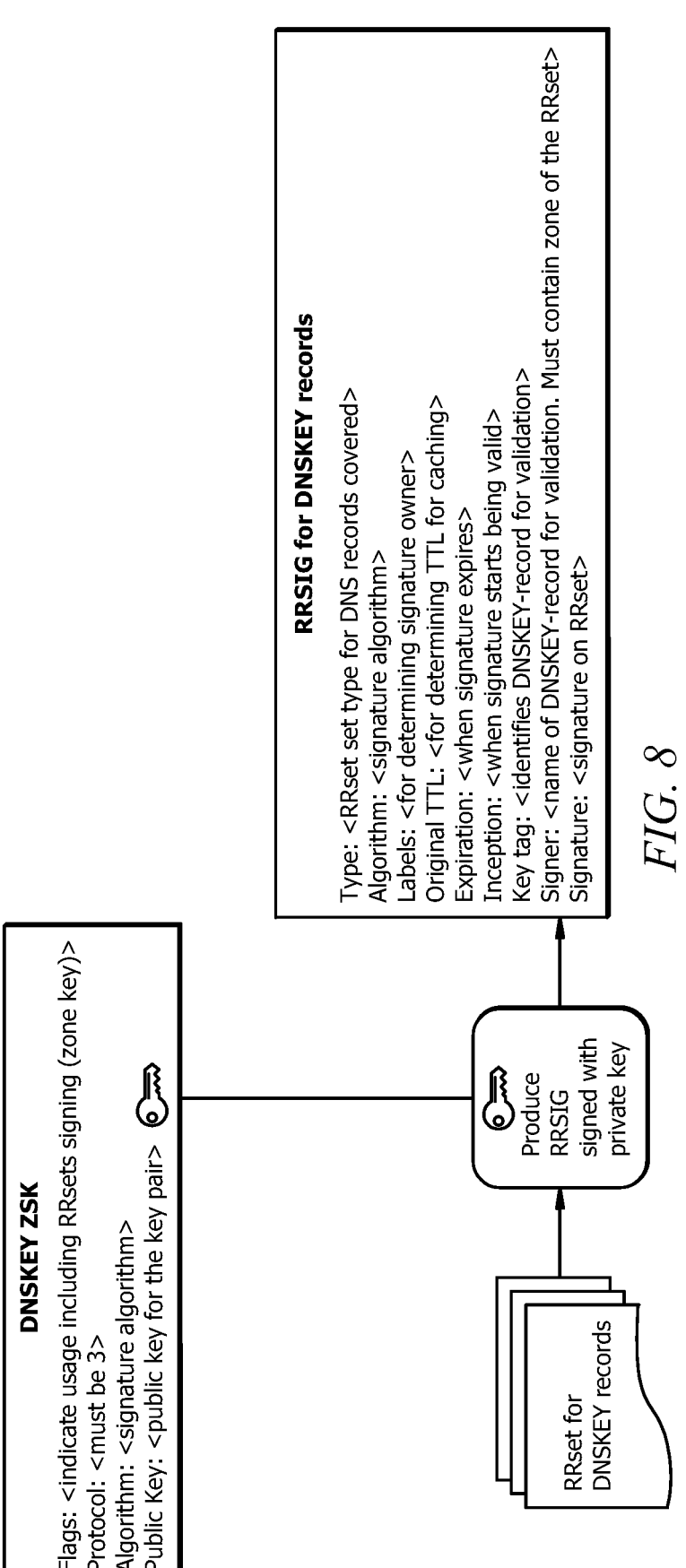
FIG. 8 illustrates an example of RRSIG Creation in DNSSEC, in accordance with certain embodiments.
Figure 9:
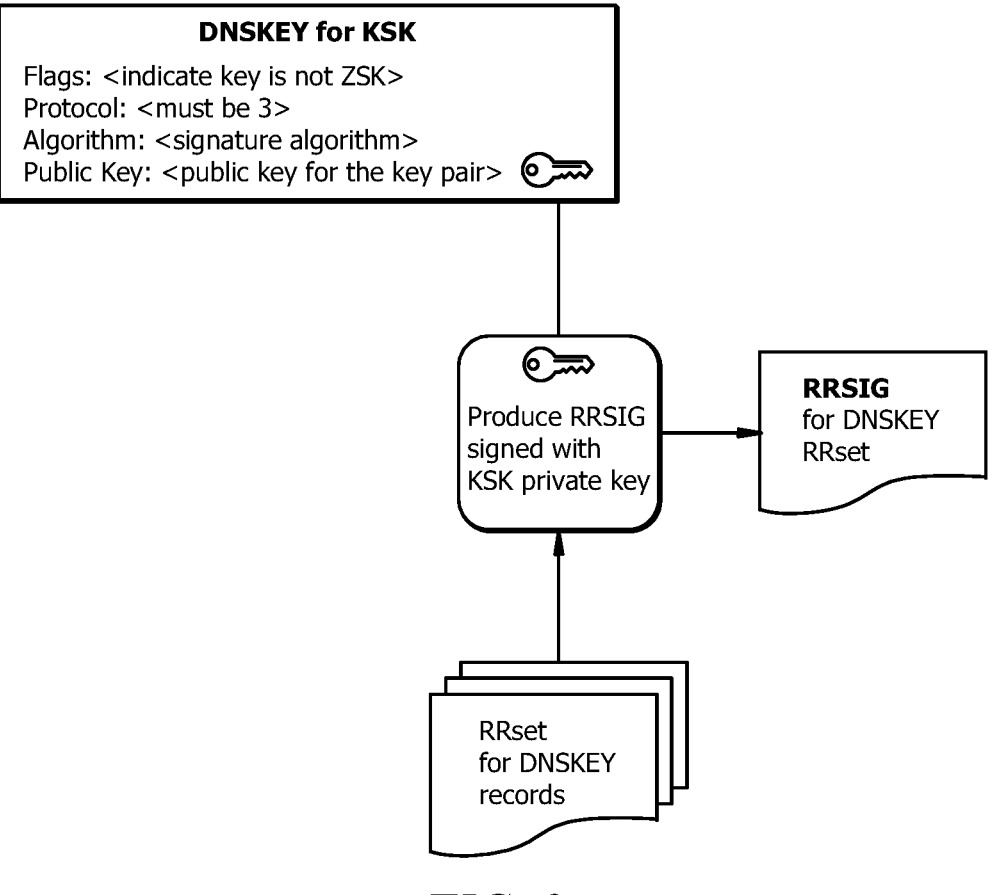
FIG. 9 illustrates an example of relationships of signing keys, in accordance with certain embodiments.
Figure 10:
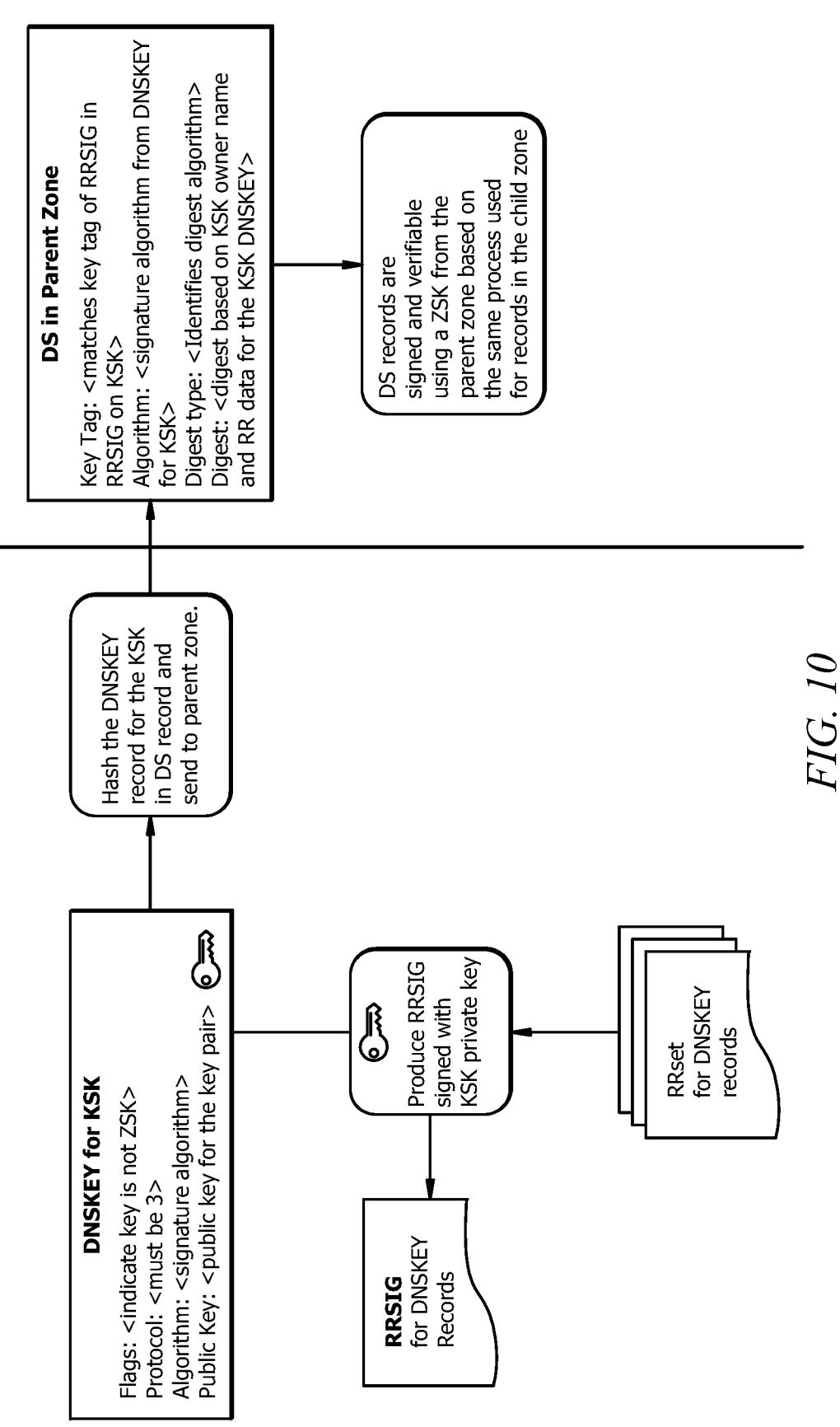
FIG. 10 illustrates an example method of DNSSEC trust chain linking, in accordance with certain embodiments.
Figure 11:
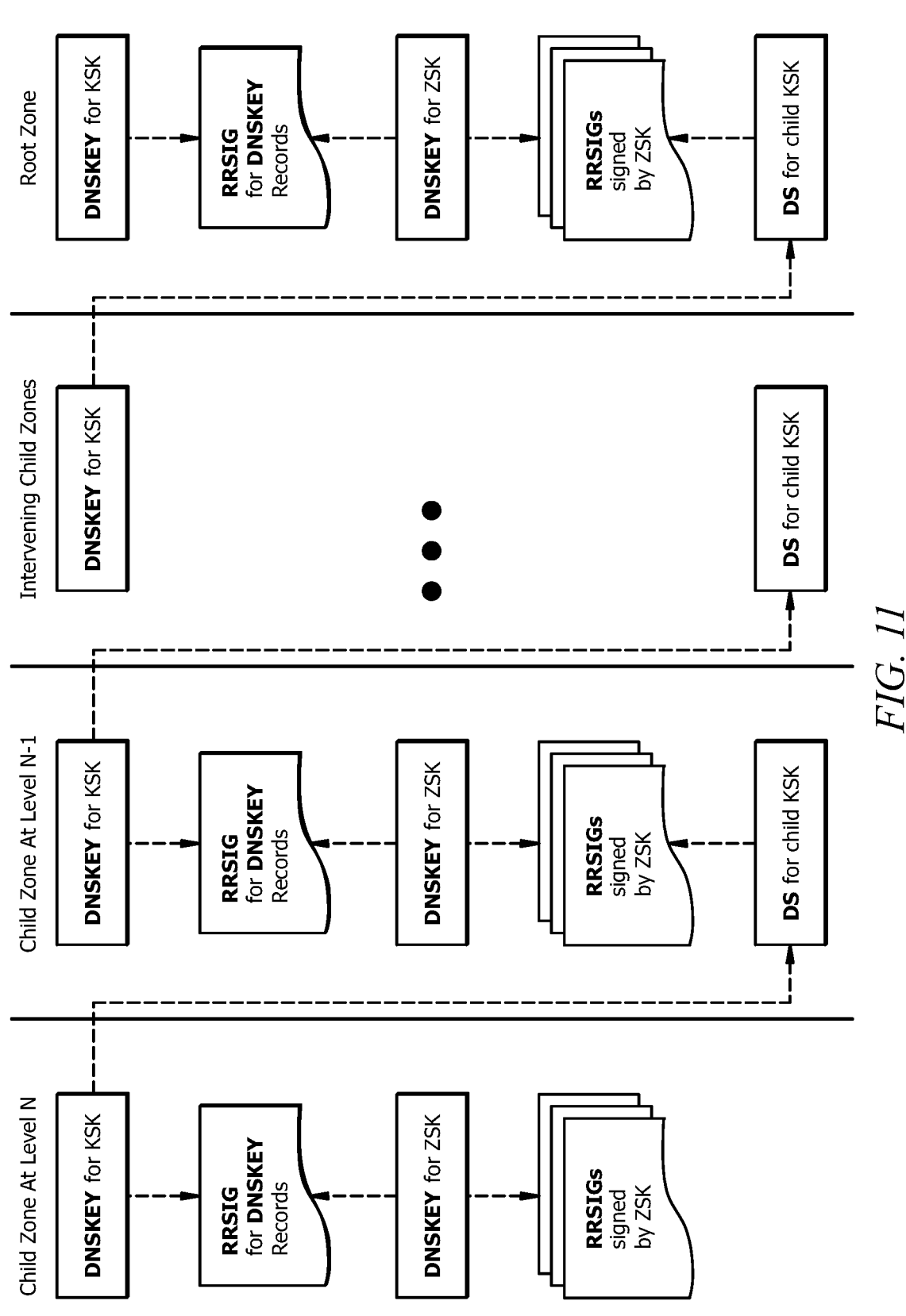
FIG. 11 illustrates an example of DNSSEC trust chain and root signing, in accordance with certain embodiments.

FIGS. 8-11 provide further examples of concepts that may be implemented in DNSSEC. FIG. 8 illustrates an example of RRSIG Creation in DNSSEC, in accordance with certain embodiments. FIG. 9 illustrates an example of relationships of signing keys, in accordance with certain embodiments. FIG. 10 illustrates an example method of DNSSEC trust chain linking, in accordance with certain embodiments. FIG. 11 illustrates an example of DNSSEC trust chain and root signing, in accordance with certain embodiments.

The following guidance is applicable to some embodiments of VIID usage to optimize resolver caching and where resolvers request current VIIDs from authoritative nameservers to use in determining whether or not cached data is current. These embodiments may be considered basic embodiments because they build on existing DNS protocol, provide backwards compatibility, and do not change the structure of DNS requests and responses in a way that would impact legacy resolvers and nameservers.

Commonalities for basic embodiments of VIID Requests and Responses may include: DNS requests remain as they are except new EDNS(0) flags are used to indicate VIID related processing is desired. Flags may also indicate specific types of VIIDs that are requested. Other methods of indicating VIID related processing is desired are possible. A nameserver that does not support VIIDs ignores VIID indicators and provides the same response that would have been provided if the VIID indicators were not in the request. A nameserver that supports VIIDs assumes that a resolver supports responses containing VIIDs if a request from the Resolver requests VIID related processing. It is possible that VIIDs will only be pertinent for certain large DNS data records, such as post-quantum DNSKEY records and/or post-quantum RRSIG records. In certain embodiments, responses must provide data rather than VIIDs when VIIDs are requested if VIIDs are not pertinent to the data. Responses to DNS requests containing VIIDs should place the VIIDs in the same response section and position that would be used for the DNS data the VIIDs apply to. VIIDs may also occur in other response sections and positions in accordance to VIID-related protocol specifications. EDNS (0) flags in a response and/or records in the additional section of a response may be used to indicate that VIIDs are provided in the response and to identify the characteristics of included VIIDs. Additional mechanisms are possible for indicating the VIIDs are in the response and the characteristics of the VIIDs.

Basic Request and Response

Listed here are examples of responses to "VIIDs requested" requests, in accordance with certain embodiments. The responses may be provided by nameservers under various scenarios. For simplicity, the examples describe data pertinent to VIIDs in response sections. The responses may also include other information that is not depicted in the examples, such as data provided in responses per current DNS protocol. In certain embodiments, EDNS (0) flags and/or records in the additional section of a response would be used to indicate characteristics of VIIDs in the response such as: identifying the DNS data that the VIIDs apply to, identifying VIID types, etc. The listed embodiments are provided as examples and are not meant to be exhaustive or limiting.

Embodiment for non-signed zone when RRsets are large (RRsets are not signed). Response: Contains VIID comprised of hash of RRset.

Embodiment for signed zones if RRSIGs are small and RRSIGs served as VIIDs for RRsets. Response: Contains VIIDs comprised of each RRSIG signature on RRset. RRset data is left out of response.

Embodiment for signed zones if RRSIGs are large and hash of RRSIGs for RRset serves as VIID for RRset. Response: Contains VIID comprised of hash of all RRSIG signatures on RRset. RRset data is left out of response.

Embodiment applicable to signed zones if RRsets are large and RRSIGs are small and it is desirable for consistency across signed and unsigned zones to only use VIIDs comprised of hashes of the data they are applicable. Response: Contains VIID comprised of hash of RRset and includes RRSIGs on RRset.

Embodiment applicable to signed zones if RRsets are small and RRSIGs are large. Response: Contains RRset data and VIID comprised of hash of all RRSIGs on RRset.

Embodiment applicable to signed zones if RRsets are small and some RRSIGs are large due to the public key cryptographic algorithm and RR level VIIDs are desired for RRSIGs. Response: Contains RRset data and either RRSIG RRs for small signatures, or for large signatures, VIIDs comprised of hashes of the signatures.

Embodiment applicable when RRsets are large and RR level VIIDs are desired for RRsets. Response: Contains VIIDs comprised of hashes of each RR in an RRset.

Embodiment for resolvers caching entire response sections as single cached objects. Applicable to DNS data that seldom changes. Response: contains VIIDs comprised of hashes that cover entire response sections for Answer and Authority sections of responses. VIIDs appear in place of response section content. VIIDs are not provided for response sections which would be left out of a response.

Embodiment for signed zone when both RRsets and RRSIGs are large and it is desirable for consistency across signed and unsigned zones to only use VIIDs comprised of hashes of the data they are applicable to. Response: contains VIID comprised of hash for RRset and VIID comprised of hash of all RRSIG signatures on RRset.

Granular Request and Response

Certain embodiments include capabilities for DNS requests to specify that a subset of applicable response data is to be provided in a DNS response. Certain embodiments may also request: data that crosses RRsets: just some elements of RRs: or combinations of data elements from more than one RR and/or RRs for multiple RRtypes. The embodiments described below would require DNS protocol extension as necessary to support the described granular requests and responses.

With the advent of post-quantum algorithms for DNSSEC that may have large key sizes and/or large signature sizes, granular requests and response embodiments become attractive as a means for minimizing the number of DNSKEY RRs and RRSIG RRs in responses. In some embodiments where a single DNSKEY and/or RRSIG RR is requested in a granular request and DNSKEY records and/or RRSIGs will fit within desirable UDP MTUs, the approach can be used with almost no change to the current DNS protocol. In cases where a desirable UDP MTU would be exceeded under current DNS protocol, VIIDs may be used to facilitate granular requests of DNSKEY and RRSIG RRs. In some scenarios, a single DNSKEY or RRSIG may fit within desirable UDP MTUs if the response is comprised of just a single RR for a DNSKEY or RRSIG. In these scenarios, a resolver may request VIIDs for a specific algorithm type, then retrieve the actual DNSKEY or RRSIG records in a following request for the desired unsigned RR. Note the approaches described herein are also more generally applicable when there are multiple DNS RRs in an RRset and they can be selectively identified.

Embodiment for signed zone with granular VIID request specifying specific algorithms for RRSIGs and RRSIGs are large. Response: contains RRset or VIID for RRset and VIID(s) comprised of hash of RRSIG RR(s) for algorithm(s). If VIID indicates RRSIG in cache is out-of-date, a granular request for RRSIG of the desired algorithm type for the RRset follows and returned RRSIG and RRSIG VIID are cached.

Embodiment for signed zone with granular VIID request specifying specific algorithms for DNSKEYs when DNSKEYs are large and RRSIGs are small. Response: contains VIID(s) for DNSKEY(s) of the desired algorithm type(s) and RRSIG RR(s) cover for each DNSKEY RR. If VIID indicates DNSKEY in cache is out-of-date, a granular request for the DNSKEY of the desired algorithm type follows and the returned DNSKEY and DNSKEY VIID are cached. This approach would require a new DNSSEC capability to sign individual RRs.

Embodiment for "Pick and Choose" for signed zone. This embodiment has the request specify it wants VIIDs for each DNSKEY and/or VIIDs for each RRSIG. Response: contains VIIDs for each DNSKEY and/or VIIDs for each RRSIG. Resolver then decides based on currency of cache and preferred algorithm types whether to do granular requests for the DNSKEY and/or RRSIGs.

Embodiment for signed zone with request indicating VIIDs are supported but requestor does not know if DNSKEYs are large and RRSIGs are large in order to request granular records. Response: authority determines response will be large and truncated. Authority sets truncation flag and then truncates the message per DNS specification but includes VIIDs for each DNS-KEY and/or VIIDs for each RRSIG. Resolver then decides based on currency of cache, records (if any) that were not truncated, and preferred algorithm types whether to do granular requests for the truncated DNS-KEYs and/or RRSIGs.

Figure 14:
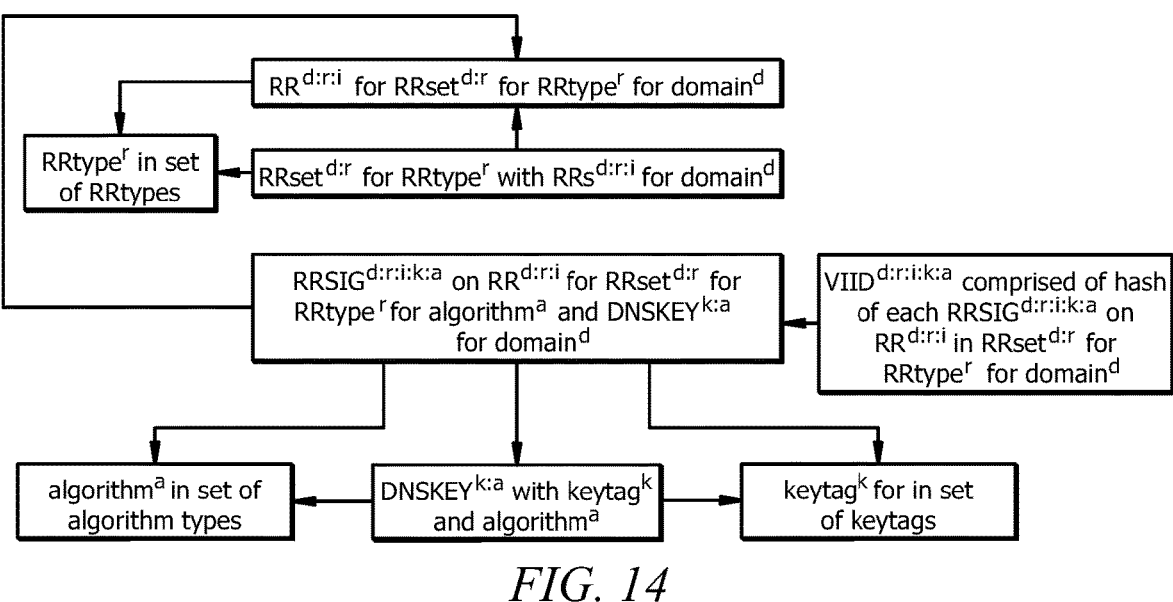
FIG. 14 illustrates an example for $domain^d$ in a DNSSEC Signed Zone with RRSIG hashes for each RRSIG RR serving as a VIID for the RRset and for the RRSIG RRs, in accordance with certain embodiments.
Figure 15:
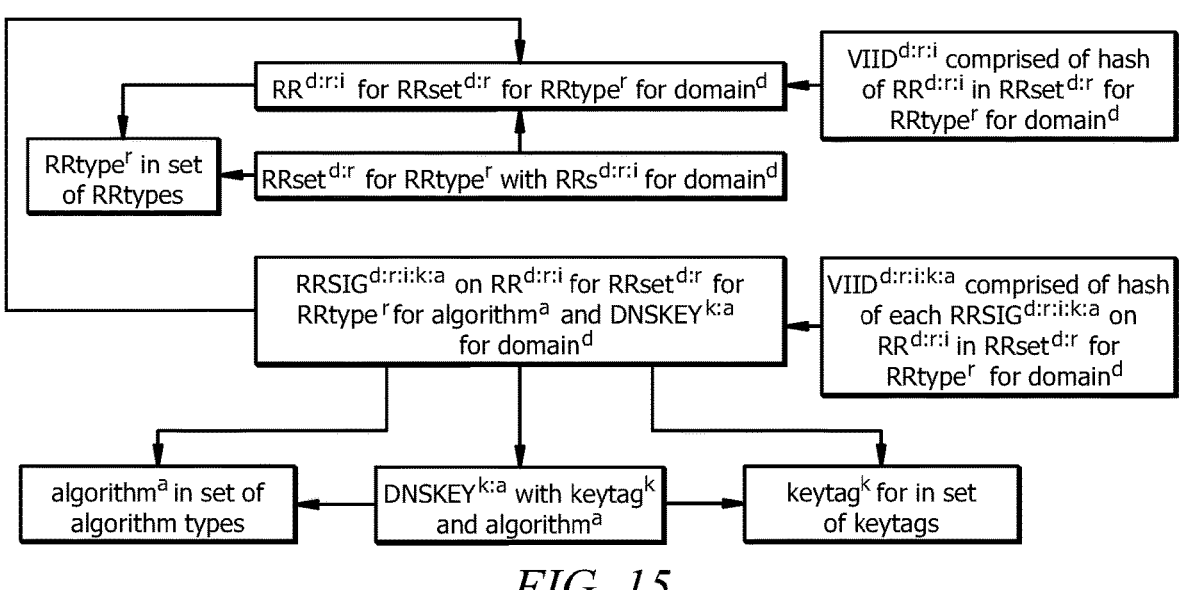
FIG. 15 illustrates an example of granular VIIDs for signed DNS records with VIIDs comprised of hashes of for each RR in RRset and hashes of each RRSIG RRs on RRset, in accordance with certain embodiments.

FIG. 12 illustrates an example of non-DNSSEC VIIDs for domain$^d$ at RRset and RRSIG signature level, in accordance with certain embodiments. FIG. 13 illustrates an example of VIIDs for domain$^d$ for DNSSEC signed zone where a hash of RRSIGs on RRset serves as VIID, in accordance with certain embodiments. FIG. 14 illustrates an example for domain$^d$ in a DNSSEC Signed Zone with RRSIG hashes for each RRSIG RR serving as a VIID for the RRset and for the RRSIG RRs, in accordance with certain embodiments. FIG. 15 illustrates an example of granular VIIDs for signed DNS records with VIIDs comprised of hashes of for each RR in RRset and hashes of each RRSIG RRs on RRset, in accordance with certain embodiments.

FIG. 16 illustrates an example of a basic DNS embodiment of VIID usage to optimize caching, in accordance with certain embodiments. Certain embodiments include options for caching-side VIID verification. At step 305, as part of recursive resolution, a resolver may issue requests to authoritative nameservers that are substantially different than original client requests and may also request DNSKEY RRsets to support DNSSEC validation. These requests will conform to the DNS protocol and the methods of the embodiment would apply to these requests.

At step 305, in some embodiments where a resolver trusts an authoritative nameserver to provide up-to-date responses that indicate the current state of data related to a queried for FQDN, a resolver may bypass recursive resolution and DNSSEC validation-related DNSKEY queries of authoritative nameservers it would normally have queried prior to querying the trusted authoritative nameserver for the FQDN. To aid in this, a resolver may store the IP address and/or domain name of such authoritative nameservers and associate them with DNS data they are authoritative for.

At step 320, this step and others requiring VIIDs are not currently part of the DNS protocol. This step requires a DNS capability for configuration of whether or not TTLs can be extended based on VIID corresponding (or matching). Such configuration may also involve setting a maximum TTL (the maximum TTL has a longer interval than the normal TTL, and the maximum TTL is used to force a refresh, for example, to keep the cache current and remediate the cumulative effect of extending the normal TTL without a refresh each time VIID correspondence (or matching) occurs) or setting an expiration date and times beyond which a TTL extension is not applicable. This capability might be implemented based on extensions to the SOA RRtype. Expiration dates and times for DNSSEC-related RRs may be specified in DNSKEY records.

At step 325, a resolver could signal that it prefers VIIDs in the response, for example, by using signaling mechanisms based on EDNS(0). Other signaling mechanisms are possible.

At step 325, a resolver may have stored DNS data at a granular level that supports more efficient caching based on the capabilities described herein for VIIDs. For example, suppose certain elements of DNS data records are considered as requiring a cache update if they have changed (IP addresses, public keys, signatures, etc.) and other elements are not cached or do not require a cache update when they change. In these cases, separate VIIDs for the elements subject to cache updating may be used. In this case, signaling or new DNS request types could be used to indicate the elements for which VIIDs are requested.

At step 335, an authoritative nameserver could use a variety of mechanisms to determine if VIIDs are supported, for example:

VIIDs may be supported for a selected subset of RRtypes or DNS data element types such as DNSKEY and RRSIG RRsets or public keys and/or signatures found in DNSKEY and RRSIG records.

VIID support may be configured for some subset of domains in a zone.

VIID support may rely on a registrant for a domain name to have requested or configured VIID support.

VIIDs may be supported based on the current state of the zone, such as a VIID having been pre-computed for a particular RRset.

Other mechanisms for determining VIID support relative to an incoming request are possible.

At step 340, certain embodiments will use cryptographic VIIDs, for example:

VIIDs that are cryptographic hashes may be based on the same hashing algorithms used for the KSK key hashes found in DS records or used for hashing RRset data that is then signed with a KSK or ZSK.

As described in this disclosure, a cryptographic VIID may be a cryptographic identifier that is used in part or in full to identify a DNS record or RRset that is stored externally to the authoritative server such as on the IPFS or in a blockchain.

A label VIID might be comprised of elements of the current DNS response format, such as the RRtype and Key Tag.

VIIDs may apply to granular elements of DNS data: for RRset, individual DNS records within a RRset, individual data elements within a RRset, all data elements of a particular type or group of types within an RRset. Other levels of granularity are possible.

At step 340, VIIDs may be dynamically created or may have been pre-generated.

At step 340, a server may signal that VIIDs are in the response via a variety of mechanisms. For instance, an EDNS(0) flag in the response may be used. Other mechanisms may be discerned by those with ordinary skill in the art.

At step 340, VIIDs may be identifiable and characteristics of the VIIDs in a response expressed via a variety of mechanisms: using new DNS RRtypes: use of prefixes that distinguish the VIIDs, placement of the VIIDs within the response, flags consistent with EDNS(0); indicators in the additional section of the response. Other mechanisms may be apparent to those with some skill in the art.

At step 340, a server may have pre-generated and stored VIIDs or may generate VIIDs dynamically and may also then store them.

At step 340 in derivative embodiments, a resolver may have included the VIID for data currently in cache and an authoritative nameserver may determine that the included VIID is not current. In embodiments of this approach, the authoritative server may return responses comprised of: an indicator that the supplied VIID is not current; the current VIID: current data: a combination of indicator, VIID, and data.

At step 345 and step 370, in various embodiments, a server may provide responses per previously described response embodiments. The methods of step 340 are applicable relative to VIIDs in the response.

At step 345 and step 370, DNS responses may not necessarily contain requested data, but rather contain other pertinent data (referrals, NSEC records, NSEC3 records), or may contain additional data (name server addresses in additional section, etc.). These responses may also contain VIIDs as an adjunct to DNS data or as a substitute to the DNS data.

At step 360, the decision logic refers to VIIDs for RRsets and RRSIGs. VIIDs may be applicable to granular DNS data which may be cached as discrete objects per previously described response embodiments.

At step 375, a resolver may have received one or more VIIDs in a response previously described with respect to the response embodiments. In this case, a resolver may cache any received VIIDs in association to the cached data they apply to.

At step 375, it is assumed that the resolver caches VIIDs in association with the data to which they apply. A resolver may dynamically generate VIIDs rather than caching them. A resolver may cache dynamically generated VIIDs.

At 375, per previously describe response embodiments, a VIID comprised of an RRSIG would not be hashed as the RRSIG serves as its own VIID.

At step 380, some embodiments where resolvers dynamically compute VIIDs do not cache VIIDs.

At step 380, a variety of mechanisms could be used to determine the new TTL for cached data and/or VIIDs. For instance, when VIIDs are applicable to just large elements of a result and the response contains a TTL, the TTL would be applied. In cases where a VIID covers the TTL and the TTL is not in the response, the TTL could be extended consistent with the last previous cached data. Other mechanisms for determining a new TTL may be used, such as using the default TTL from the SOA RR or aligning a TTL with the expiration date and time for the DNSKEY used to create an RRSIG on an RRset.

Out-of-Band Data Retrieval

In certain embodiments, the basic concept of out-of-band data retrieval comprise relieving authoritative nameservers of returning large DNS responses via UDP. As examples, the following three high-level methods may be used for out-of-band data retrieval:

Large DNS data records are stored in external services and retrieved out-of-band based on reference information in DNS responses.

The reference information for out-of-band retrieval could contain a VIID that could be used for caching optimizations as previously described including validation of out-of-band data.

Cryptographic VIIDs as an element of reference information uniquely identify a DNS data instance for out-of-band retrieval and provide the benefit of allowing validation of DNS data retrieved out-of-band.

As an additional option, an "out of band" resolution method may be provided for each VIID type in references. For instance, a cryptographic VIID could be a hash index from a distributed hash table, such as IPFS, such as where the full value is stored in the hash table. A label VIID in a reference could point to another DNS record, or to a non-DNS resource, which has the full value.

Because DNSSEC keys are validated by other DNSSEC keys in the hierarchy, a VIID comprised of a hashed DNS-KEY does not need to have its own separate validation.

Because DNSSEC signatures (RRSIGs) are likewise validated via other keys, a VIID comprised of a hashed signature does not need to have its own separate validation.

DNSSEC public key algorithms could have an "in band" algorithm type for DNSSEC (such as where the full value is stored in the DNS record) and an "out of band" algorithm type employing the techniques previously described. Algorithm negotiation would enable the resolver to indicate which type(s) it supports. This could be based on signaling mentioned herein. Certain embodiments may build on algorithm negotiation methods, such as those referenced above with respect to step 120 of FIG. 5.

For DNSSEC, a general-purpose "out of band" algorithm type such as DNSSEC algorithm type 252, which is reserved for "indirect keys" according to RFC 4034, may be indicated during algorithm negotiation, with a field indicating the specific underlying algorithms. This field could be defined as a new DNS request element and/or response element or could build on existing flexibility within the DNS request and/or response structure.

Out-of-Band DNS Embodiments

Certain embodiments for out-of-band retrieval of DNS data add to current DNS protocol and are backward compatible so as not to interfere with the capability of legacy resolvers and authoritative servers (in this manner, legacy resolvers and authoritative servers may continue to interact according to current DNS protocol). Certain embodiments indicate DNS protocol additions using signaling mechanisms, such as EDNS(0) or new DNS record types in the additional section of responses. Other additive signaling mechanisms may be used.

The embodiment adds to current DNS protocol by allowing references to DNS data to be returned to resolvers rather than the actual data. The references may then be used for out-of-band retrieval of DNS data. In the embodiment detailed herein, the DNS data for out-of-band access is stored in IPFS. Other embodiments may store data for out-of-band retrieval on nameservers or on external service such as a blockchain or CDNs. Those with ordinary skill in the art may adapt the methods of the embodiment for these other services that could store DNS data.

According to an embodiment, references should appear in a response in the same location the data itself would appear in responses according to current DNS protocol. Responses containing references should contain an indicator that references are in the response and may contain indicators of the characteristics of the references. The indicator indicating that references are in the response may be explicit or implicit. As an example of an implicit indicator, the absence of any contrary indicator may implicitly indicate that references are in the response.

IPFS addresses for DNS data stored in IPFS may serve as cryptographic VIIDs for the data and may be used for cache optimization according to methods described herein. Other embodiments may use services for storing DNS data that do not inherently use cryptographic identifiers that apply to the data. For these services, cryptographic VIIDs or label VIIDs may be generated by an authoritative nameserver and used as identifiers for data stored in the services. In all cases, for example, it is the responsibility of the resolver to verify that a VIID verifies retrieved data, either by validating a cryptographic VIID applies to retrieved data or by establishing a secure link to a service and using a label VIID as an identifier for retrieved data. In cases where DNSSEC processing is used to validate retrieved DNS data, the RRSIGs on the data or hashes of them may serve as VIIDs and DNSSEC defines the VIID validation mechanism.

VIIDs may be stored on an authoritative nameserver in association with the domain name and RRtype for associated DNS data. For granular data and corresponding VIIDs, such as individual RRs and their VIIDs, an indicator for the specific RR associated with a VIID is stored.

The same DNS data may be stored on a nameserver and on external services. This supports backward compatibility as nameservers that do not support out-of-band data may return data that is on the nameserver rather than a reference to the data.

For an embodiment where out-of-band DNS data is stored in IPFS, the DNS data for a domain might be stored under a top-level IPFS folder which is pointed to by a DNSlink record on the nameserver. The object name for DNS data stored under the folder may be comprised of elements that associate the data with the RRtype of the data and other pertinent labeling of the data such as algorithm type for DNSKEY and RRSIG RRtypes. Listing the contents of the folder pointed to by the DNSlink record would then reveal the IPFS addresses of DNS data in the folder and characteristics of the data, such as RRtype or algorithm type for DNSKEY and RRSIG RRs. In other embodiments, similar methods may be used for other external stores that support having a container identified by a reference, and where the labeling and/or meta-data for container content can be used to determine the characteristics of DNS data in the container and to support retrieval of that data.

The methods of embodiments for out-of-band retrieval of DNS data may be applied to arbitrary new DNS RRtypes or additional capabilities embodied by existing RRtypes in conjunction with caching services for those DNS RRtypes so as to enable domain names to act as identifiers within a content distribution network or derivative of a named data networking (NDN) where data for the DNS RRtypes serve as the data for optimized caching.

Reference Responses

For the embodiments of reference responses detailed below, the reference may indicate it is a reference, identify the external service to which it applies and the method for connecting to and authenticating with the external service. Given this, identifiers for DNS data on the external service and additional data in the references are described.

Embodiment for non-signed zone with arbitrary identifiers unique to the external service. Identifier that is unique on the external service and applies to the RRset the reference is applicable to.

Embodiment with hash of RRset as both VIID and identifier on external service. Identifier comprised of a VIID that is a hash of the RRset. This embodiment is applicable to IPFS as an external service and is also possibly applicable to other external services that use hashes as identifiers.

Embodiment with label identifier. Identifier comprised of at least the domain name and RRtype of the data.

Embodiment with RRSIG hash as both Identifier and VIID. Identifier that is comprised of a hash of all RRSIG RRs for the RRset.

Embodiment with combo label and cryptographic identifier in reference. Identifier comprised of the domain name, the RRtype, and a VIDD that is either a hash of the RRset or a hash of all the RRSIG RRs on the RRset.

References for Individual RRs. In some embodiments, the current response format is kept except that references replace some or all RRs in the response. In this case, the identifiers for the RRs could be based on hashes of the RRs and could also include label elements similar to those described above. For DNSKEY and RRSIG RR references, the identifier may also include an indicator for the algorithm type.

Those of ordinary skill in the art may discern other embodiments for references. The described embodiments, for example, are limited and selected based on their possible desirability for implementations of out-of-band DNS data storage and retrieval.

Options for Reference Data Relationships

Figure 17:
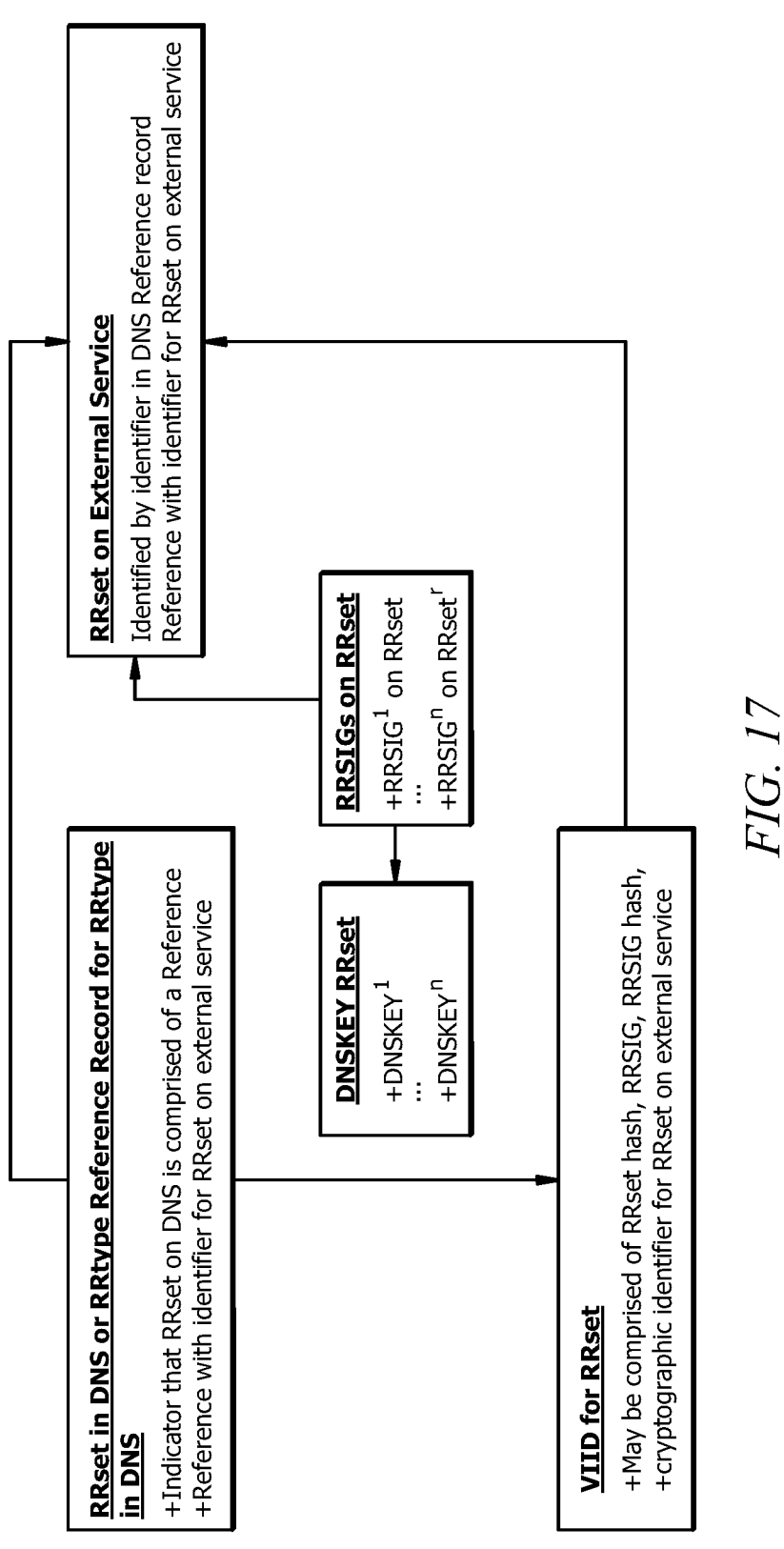
FIG. 17 illustrates an example of DNS Reference Data Relationships, in accordance with certain embodiments.

FIG. 17 illustrates an example of DNS Reference Data Relationships, in accordance with certain embodiments. If RRSIGs RRs are used as VIIDs for RRSIGs stored individually on the external service, then there may be no need for separately recording the VIIDs. In some embodiments, references may be to a new type of DNS record that is retrievable via out-of-band mechanisms from the nameserver. In some embodiments, the function of existing DNS RRtypes may be extended to allow them to be used as references to arbitrary data types.

Options for Out-of-Band IPFS Registration

FIG. 18 illustrates an example of out-of-band IPFS registration, in accordance with certain embodiments. For simplicity, FIG. 18 does not show details related to RRset signing for DNSSEC, error checking, and edge cases. Those of ordinary skill in the art may discern these details and the options for how the processing flows of the diagram may be adjusted to take them into account. For instance, the methods of the diagram may be applied to storing RRSIG RRs that are generated during registration and then stored for out-of-band retrieval and creating DNS references to those RRSIG RRs.

In some embodiments, where RRs within a RRset may be of different types, such as for DNSKEY and RRSIG RRs for different algorithm types, RRs of a type that is small may be stored on the nameserver only, and only RRs of a type that is large are stored on an external service and/or have references created for them. In some embodiments, RRs of a type that is small may comprise RRs whose resource data is small, and RRs of a type that is large may comprise RRs whose resource data is large. In some embodiments, RRs of a type that is small may comprise RRs associated with a small data value, and RRs of a type that is large may comprise RRs associated with a large data value. In that case, the "small data value" may be stored in DNS, and the "large data value" may be stored in an external service.

In these cases, methods of granular embodiments may apply so that VIIDs and references are at the RR level and optimized caching would be performed at the RR level.

The diagram depicts an exemplary core process by which DNS data in the form of an RRset being registered into a DNS server may be stored out of DNS in IPFS and the IPFS address for the RRset then stored in DNS as the VIID associated with the RRset. Not depicted are steps required when DNSSEC-related RRset signing is performed. These steps create an RRSIG on the RRset, and these steps may store the RRSIG in IPFS and store the IPFS address of the RRSIG in DNS as the VIID associated with the RRset. The RRSIG and RRSIG VIID may also be stored on the nameserver to support responses where the nameserver may provide an RRSIG and/or RRSIG VIID.

The diagram assumes the DNS provider ensures that references, and DNS data on IPFS are kept in sync, e.g., the references have corresponding data in IPFS and orphan data in IPFS is purged. Methods for performing such synchronization are known to those of ordinary skill in the art. For non-IPFS embodiments, the hash {H} generated at 405 may be used as an identifier for naming the data stored on the external service and then used as a VIID for data validation and cache optimization. {H} might also be stored as metadata associated with the data and used as a VIID when retrieved in association with the data.

At step 400, the DNS provider may have implemented checks to ensure that RRset data is only created or updated when needed.

At step 405, creation of {H} requires execution of the same processing that IPFS does to create IPFS addresses.

At step 405, and throughout the following steps, VIIDs may be created on elements of the RRset per previously described granular embodiments. A VIID on the whole RRset may also still be created. More granular VIIDs support having elements of the RRset that are not core (TTLs, . . . ) change without affecting core data such as IP addresses, public keys, TXT record content, and the like. Such VIIDs might be formed using mechanisms described herein for VIID creation. These VIIDs might be stored in DNS in association with the address for the RRset in IPFS and/or the domain name applicable to the RRset. In some embodiments, these VIIDs may be comprised of IPFS addresses for the elements to which they apply and which are stored in IPFS as distinct objects.

In some embodiments, VIIDs are not be stored in DNS, but rather may just exist as IPFS addresses for RRsets stored in a folder in IPFS and where the human readable name for the RRset is comprised of the domain name and the RRtype of the RRset per the Overview of the embodiment.

Figure 19:
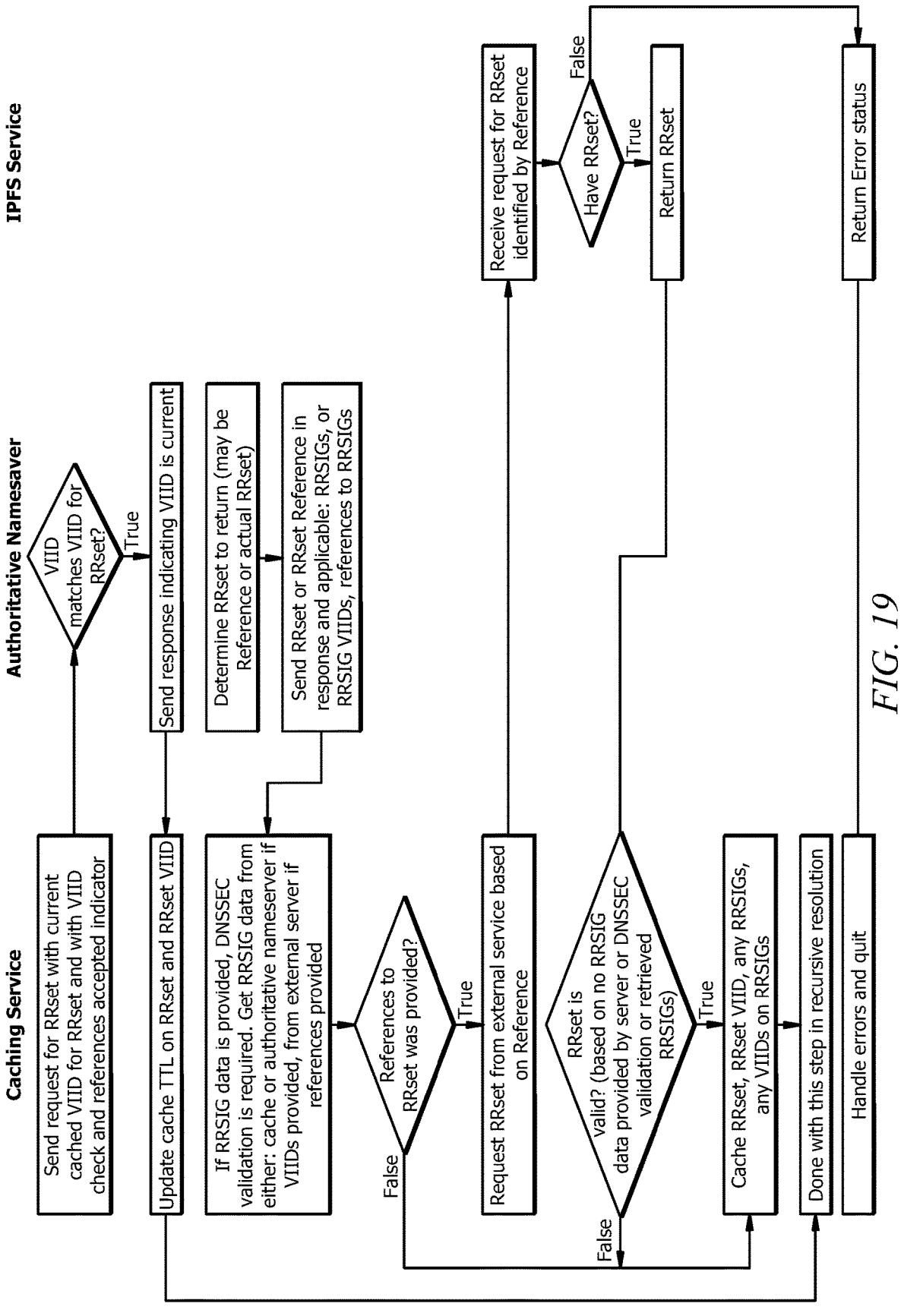
FIG. 19 illustrates an example of out-of-band IPFS for resolution with DNSSEC and nameserver VIID check, in accordance with certain embodiments.

Options for Out-of-Band IPFS Embodiment for Resolution with DNSSEC and Nameserver VIID Check FIG. 19 illustrates an example of out-of-band IPFS for resolution with DNSSEC and nameserver VIID check, in accordance with certain embodiments. The embodiment diagram only shows processing from the point where a resolver that accepts references wants to have server verification of whether or not an expired cached RRset is current. The depicted processing ends when the resolver completes processing of the server response including any DNSSEC related processing relative to responding to the request. To provide backwards compatibility, nameservers may need to keep all DNS data on the nameserver and serve up that data unless a resolver indicates they support references. In certain embodiments, DNSSEC validation may operate as per current DNSSEC validation protocol with the exception that when a reference is returned during a validation step, the reference is used to retrieve data needed for the validation (such as DNSKEY, RRSIG and DS RRsets and RRs).

Options to Protect Against Infinite Recursion

Certain embodiments improve the out-of-band retrieval mechanism described above. For example, the use of references containing domain names creates the potential for infinite recursion. This is based on the resolver receiving a domain name in a reference that then chains to additional references to be resolved. In this case, the chain must end with a response that does not contain any references. To protect against chains that loop back, and which would cause infinite recursion, one or more of the following methods may be used:

Method 1: Resolvers will not accept references in responses for DNS queries during resolution of references. This is implemented by having a resolver not send an indicator that it accepts references in responses during resolution of a reference. Resolvers may accept untrusted data in responses during resolution of references as DNSSEC validation will still serve to verify the validity of the retrieved data when it is plugged in during validation. Therefore, during resolution of references a resolver would not set the indicator that it accepts DNSSEC data.

Method 2: On receiving a first response containing a reference, a resolver may keep a record or indicator for each domain name and RRType received in responses during resolution and stop recursive resolution if a response contains a reference for a previously queried for domain name and RRType.

Method 3: Responses containing references may contain "glue" similar to that used for NS records in referrals, where the glue contains one or more IP addresses to use in identifying and interacting with the entity/service identified in the reference.

Method 4: Maintain counters for each query chain to track the number of sub-queries and referrals so that the query chain can fail if the maximum query count is reached.

Other embodiments may use other methods for preventing infinite loops in recursive resolution.

Example Apparatus

Figure 20:
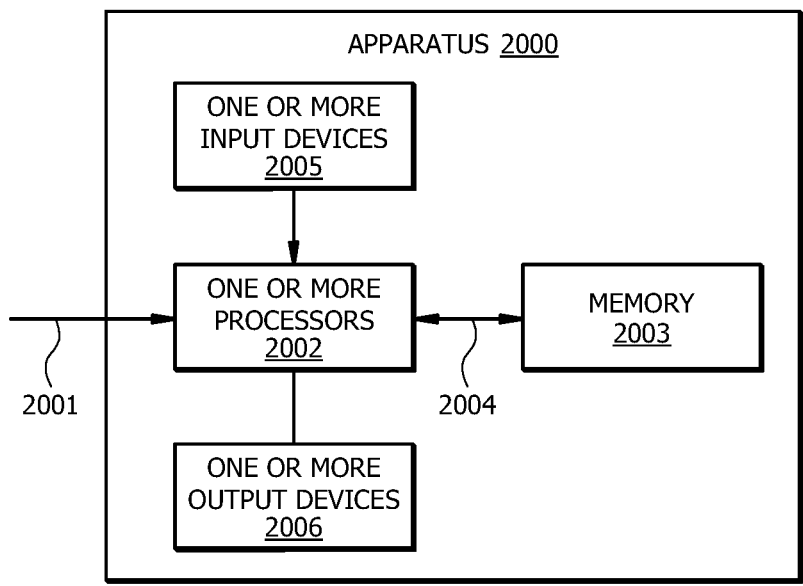
FIG. 20 illustrates an example of an apparatus that may be used to implement one or more features disclosed herein, in accordance with certain embodiments.

FIG. 20 depicts an example of an apparatus 2000 that facilitates validation and/or retrieval of cached data. In this example, the apparatus 2000 includes one or more processors 2002, one or more output devices 2006, a memory 2003, and one or more user input devices 2005.

The one or more processors 2002 may include a general-purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

The memory 2003 is accessible by the one or more processors 2002 via the link 2004 so that the one or more processors 2002 can read information from and write information to the memory 2003. In one example, the one or more user input collected by one or more user input devices 2005 is processed by the one or more processors 2002 and stored in the memory 2003. Memory may be integral with or separate from the processors. Examples of the memory 2003 include RAM, flash, ROM, EPROM, EEPROM, registers, disk storage, or any other form of storage medium. The memory 2003 may store instructions that when executed by the one or more processors 2002 implement one or more embodiments of the invention. The memory 2003 may store instructions that when executed by the one or more processors 2002 cause the one or more processors 2002 to implement one or more embodiments of the invention. Memory 2003 may be a non-transitory computer-readable medium that stores instructions, which when executed by a computer, cause the computer to perform one or more of the exemplary methods discussed herein.

According to certain embodiments, a computer-implemented method may comprise one or more of the methods described herein. Further, an apparatus may comprise one or more processors and one or more non-transitory computer-readable media storing instructions that, when executed by the one or more processors, cause the apparatus to perform one or more of the methods described herein. Further, a system may comprise one or more processors and one or more non-transitory computer-readable media storing instructions that, when executed by the one or more processors, cause the one or more processors to perform one or more of the methods described herein. Further, one or more non-transitory computer-readable media may store instructions that, when executed by one or more processors, cause the performance of one or more of the methods described herein.

According to certain embodiments, a caching service comprises one or more processors 2002 that obtain a first identifier that the caching service associates with cached data. For example, the first identifier may be obtained from memory 2003 or generated dynamically be the one or more processors 2002. The one or more processors 2002 receive, via one or more inputs 2001, a second identifier that an authoritative service associates with current data. The one or more processors 2002 determine whether the first identifier corresponds to (or matches) the second identifier and perform an action to maintain or update the cached data based on whether the first identifier corresponds to (or matches) the second identifier.

According to certain embodiments, an authoritative service comprises one or more processors 2002 that obtain a first identifier that the authoritative service associates with current data. For example, the first identifier may be obtained from memory 2003 or generated dynamically be the one or more processors 2002. The one or more processors 2002 receive, via one or more inputs 2001, a second identifier that a caching service associates with cache data. The one or more processors 2002 determine whether the first identifier corresponds to (or matches) the second identifier. The one or more processors 2002 send an indication to the caching service via one or more output devices 2006. The indication indicates to maintain or update the cache data based on whether the first identifier corresponds to (or matches) the second identifier.

According to certain embodiments, a caching service comprises one or more processors 2002 that send a first request via one or more output devices 2006. The first request is sent to an authoritative service, and the first request requests a data object. The one or more processors 2002 receive a response from the authoritative service via one or more inputs 2001. The response comprises a reference to an out-of-band source from which to retrieve the data object. The one or more processors 2002 send a second request via the one or more output devices 2006. The second request is sent to the out-of-band source to request the data object. The one or more processors receive the data object from the out-of-band source via the one or more inputs 2001.

According to certain embodiments, an authoritative service comprises one or more processors 2002 that receive a request for a data object from a caching service via one or more inputs 2001 and facilitate out-of-band transfer of the data object to the caching service.

According to certain embodiments, a caching service comprises one or more processors 2002 that send a granular request for data via one or more output devices 2006. The granular request requests a portion of data comprising less than a full resource record (RR) set. The one or more processors 2002 receive the portion of data via one or more inputs 2001.

According to certain embodiments, an authoritative service comprises one or more processors 2002 that receive, via one or more inputs 2001, a granular request for data from a caching service. The granular request requests a portion of data comprising less than a full resource record (RR) set. The one or more processors 2002 send a response to the caching service via one or more output devices 2006. The response comprises the portion of data or a reference to an out-of-band source from which to retrieve the portion of data.

According to certain embodiments, a caching service comprises one or more processors 2002 that determine options available for reducing data transfer between the caching service and an authoritative service. The one or more processors 2002 use at least two of the options to reduce the data transfer between the caching service and the authoritative service.

According to certain embodiments, an authoritative service comprises one or more processors 2002 that determine options available for reducing data transfer between the authoritative service and a caching service. The one or more processors 2002 use at least two of the options to reduce the data transfer between the authoritative service and the caching service.

MODIFICATIONS

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure.

ILLUSTRATIVE EMBODIMENTS

Embodiment A.1. A computer-implemented method for use by a Domain Name System (DNS) nameserver, the computer-implemented method comprising: obtaining a first identifier that the DNS nameserver associates with current data, the current data comprising at least a portion of one or more DNS resource records: receiving or obtaining a second identifier that a DNS resolver associates with cache data: determining whether the first identifier corresponds to the second identifier; and sending the DNS resolver an indication to maintain or update the cache data based on whether the first identifier corresponds to the second identifier.

Embodiment A.2. An apparatus for use by a Domain Name System (DNS) nameserver, the apparatus comprising one or more processors and one or more non-transitory computer-readable media storing instructions that, when executed by the one or more processors, cause the apparatus to perform operations comprising: obtaining a first identifier that the DNS nameserver associates with current data, the current data comprising at least a portion of one or more DNS resource records: receiving or obtaining a second identifier that a DNS resolver associates with cache data: determining whether the first identifier corresponds to the second identifier; and sending the DNS resolver an indication to maintain or update the cache data based on whether the first identifier corresponds to the second identifier.

Embodiment A.3. A system for use by a Domain Name System (DNS) nameserver, the system comprising one or more processors and one or more non-transitory computer-readable media storing instructions that, when executed by the one or more processors, cause the one or more processors to perform operations comprising: obtaining a first identifier that the DNS nameserver associates with current data, the current data comprising at least a portion of one or more DNS resource records: receiving or obtaining a second identifier that a DNS resolver associates with cache data: determining whether the first identifier corresponds to the second identifier; and sending the DNS resolver an indication to maintain or update the cache data based on whether the first identifier corresponds to the second identifier.

Embodiment A.4. One or more non-transitory computer-readable media for use by a Domain Name System (DNS) nameserver, the one or more non-transitory computer-readable media storing instructions that, when executed by one or more processors, cause the performance of operations comprising: obtaining a first identifier that the DNS nameserver associates with current data, the current data comprising at least a portion of one or more DNS resource records: receiving or obtaining a second identifier that a DNS resolver associates with cache data: determining whether the first identifier corresponds to the second identifier; and sending the DNS resolver an indication to maintain or update the cache data based on whether the first identifier corresponds to the second identifier.

The embodiments A.1, A.2, A.3, A.4 may have one or more of the following in any combination unless clearly mutually exclusive: Feature 1: when the first identifier corresponds to the second identifier, sending the indication to maintain the cache data, the indication indicating to increase a time-to-live associated with the cache data. Feature 2: when the first identifier does not correspond to the second identifier: sending the DNS resolver the indication to update the cache data; and sending the DNS resolver at least a portion of the current data or a reference to at least a portion of the current data. Feature 3: when the first identifier does not correspond to the second identifier: sending the DNS resolver the indication to update the cache data; and sending the DNS resolver at least a portion of the current data, wherein the at least a portion of the current data is sent via a connectionless protocol. Feature 4: the connectionless protocol is User Datagram Protocol (UDP). Feature 5: determining whether the first identifier corresponds to the second identifier is in response to a timer expiry. Feature 6: determining whether the first identifier corresponds to the second identifier is in response to a request from the DNS resolver. Feature 7: determining that the first identifier corresponds to the second identifier indicates that the current data corresponds to the cache data. Feature 8: the at least a portion of the one or more DNS resource records comprises information used for DNS Security Extensions (DNSSEC) validation. Feature 9: the information used for DNSSEC validation comprises a key or a signature. Feature 10:

obtaining the first identifier comprises retrieving the first identifier from memory of the DNS nameserver. Feature 11: obtaining the first identifier comprises dynamically calculating the first identifier by the DNS nameserver. Feature 12: the first identifier is derived from the current data and the second identifier is derived from the cache data. Feature 13: the first identifier comprises a hash of the current data and the second identifier comprises a hash of the cache data. Feature 14: the first identifier comprises a subset of a hash of the current data and the second identifier comprises a subset of a hash of the cache data. Feature 15: the first identifier comprises a subset of the current data and the second identifier comprises a subset of the cache data. Feature 16: the first identifier and the second identifier are each managed by the DNS nameserver, wherein the first identifier is bound to the current data and the second identifier is bound to the cache data. Feature 17: the DNS nameserver is configured to guarantee, confirm, and/or validate that the first identifier is for the current data, and the DNS nameserver is configured to guarantee, confirm, and/or validate that the second identifier is for the cache data. Feature 18: the first identifier is a first verifiable instance identifier (VIID) and the second identifier is a second VIID. Feature 19: further comprising: receiving a request for at least a portion of the current data from the DNS resolver; and facilitating out-of-band transfer of the at least a portion of the current data to the DNS resolver. Feature 20: facilitating the out-of-band transfer of the at least a portion of the current data is based at least in part on determining that a size of the at least a portion of the current data exceeds a threshold. Feature 21: facilitating the out-of-band transfer of the at least a portion of the current data comprises indicating, to the DNS resolver, a reference to an out-of-band source from which to retrieve at least a portion of the current data. Feature 22: the first identifier comprises a reference to an out-of-band data source from which to receive at least a portion of the current data. Feature 23: further comprising: receiving a granular request for data from a DNS resolver, the granular request requesting a portion of the current data comprising less than a full resource record (RR) set; and sending to the DNS resolver the portion of the current data or a reference to an out-of-band source from which to retrieve the portion of the current data. Feature 24: the granular request indicates one or more requested RRs selected from the full RR set. Feature 25: the granular request indicates one or more requested elements of one or more RRs selected from the full RR set. Feature 26: the second identifier is received from the DNS resolver.

Embodiment B.1. A computer-implemented method for use by a Domain Name System (DNS) resolver, the computer-implemented method comprising: obtaining a first identifier that the DNS resolver associates with cache data, the cache data comprising at least a portion of one or more DNS resource records: receiving or obtaining a second identifier that a DNS nameserver associates with current data: determining whether the first identifier corresponds to the second identifier; and performing an action to maintain or update the cache data based on whether the first identifier corresponds to the second identifier.

Embodiment B.2. An apparatus for use by a Domain Name System (DNS) resolver, the apparatus comprising one or more processors and one or more non-transitory computer-readable media storing instructions that, when executed by the one or more processors, cause the apparatus to perform the operations comprising: obtaining a first identifier that the DNS resolver associates with cache data, the cache data comprising at least a portion of one or more DNS resource records: receiving or obtaining a second identifier that a DNS nameserver associates with current data: determining whether the first identifier corresponds to the second identifier; and performing an action to maintain or update the cache data based on whether the first identifier corresponds to the second identifier.

Embodiment B.3. A system for use by a Domain Name System (DNS) resolver, the system comprising one or more processors and one or more non-transitory computer-readable media storing instructions that, when executed by the one or more processors, cause the one or more processors to perform operations comprising: obtaining a first identifier that the DNS resolver associates with cache data, the cache data comprising at least a portion of one or more DNS resource records: receiving or obtaining a second identifier that a DNS nameserver associates with current data: determining whether the first identifier corresponds to the second identifier; and performing an action to maintain or update the cache data based on whether the first identifier corresponds to the second identifier.

Embodiment B.4. One or more non-transitory computer-readable media for use by a Domain Name System (DNS) resolver, the one or more non-transitory computer-readable media storing instructions that, when executed by one or more processors, cause the performance of operations comprising: obtaining a first identifier that the DNS resolver associates with cache data, the cache data comprising at least a portion of one or more DNS resource records: receiving or obtaining a second identifier that a DNS nameserver associates with current data: determining whether the first identifier corresponds to the second identifier; and performing an action to maintain or update the cache data based on whether the first identifier corresponds to the second identifier.

The embodiments B.1, B.2, B.3, B.4 may have one or more of the following in any combination unless clearly mutually exclusive: Feature 1: when the first identifier corresponds to the second identifier, performing the action to maintain the cache data, the action to maintain the cache data comprising increasing a time-to-live associated with the cache data. Feature 2: when the first identifier does not correspond to the second identifier, performing the action to update the cache data, the action to update the cache data comprising receiving at least a portion of the current data. Feature 3: the at least a portion of the current data is received via an out-of-band data source. Feature 4: the second identifier comprises a reference to an out-of-band data source from which to receive the at least a portion of the current data, and wherein the at least a portion of the current data is received from the out-of-band data source indicated by the reference. Feature 5: at least a portion of the cache data is received from an out-of-band data source indicated by a reference derived at least in part from the first identifier. Feature 6: the at least a portion of the current data is received from an out-of-band data source indicated by a reference derived at least in part from the second identifier. Feature 7: the at least a portion of the current data is received in response to a granular request, the granular request indicating a requested subset of the current data. Feature 8: the at least a portion of the current data is received via a connectionless protocol. Feature 9: the connectionless protocol is User Datagram Protocol (UDP). Feature 10: determining whether the first identifier corresponds to the second identifier is in response to an expiry associated with the first identifier or an expiry associated with the cache data. Feature 11: determining whether the first identifier corresponds to the second identifier is in response to a request from the DNS nameserver. Feature 12: determining that the first identifier corresponds to the second identifier indicates that the cache data corresponds to the current data. Feature 13: at least a portion of the one or more DNS resource records comprises information used for DNS Security Extensions (DNSSEC) validation. Feature 14: the information used for DNSSEC validation comprises a key or a signature. Feature 15: obtaining the first identifier comprises retrieving the first identifier from memory of the DNS resolver. Feature 16: obtaining the first identifier comprises dynamically calculating the first identifier by the DNS resolver. Feature 17: the first identifier is derived from the cache data and the second identifier is derived from the current data. Feature 18: the first identifier comprises a hash of the cache data and the second identifier comprises a hash of the current data. Feature 19: the first identifier comprises a subset of a hash of the cache data and the second identifier comprises a subset of a hash of the current data. Feature 20: the first identifier comprises a subset of the cache data and the second identifier comprises a subset of the current data. Feature 21: the first identifier and the second identifier are each managed by the DNS nameserver, wherein the first identifier is bound to the current data and the second identifier is bound to the cache data. Feature 22: the DNS nameserver is configured to guarantee, confirm, and/or validate that the first identifier is for the current data, and the DNS nameserver is configured to guarantee, confirm, and/or validate that the second identifier is for the cache data. Feature 23: the first identifier is a first verifiable instance identifier (VIID) and the second identifier is a second VIID. Feature 24: sending a first request for at least a portion of the current data to the DNS nameserver: receiving a response from the DNS nameserver, the response comprising a reference to an out-of-band source from which to retrieve the at least a portion of the current data: sending a second request for the at least a portion of the current data to the out-of-band source; and receiving the at least a portion of the current data from the out-of-band source. Feature 25: sending a granular request for data, the granular request requesting a portion of the current data, the portion of the current data comprising less than a full resource record (RR) set; and receiving the portion of the current data. Feature 26: the granular request indicates one or more requested RRs selected from the full RR set. Feature 27: the granular request indicates one or more requested elements of one or more RRs selected from the full RR set. Feature 27: the second identifier is received from the DNS nameserver.

Embodiment C.1. A computer-implemented method for use by a Domain Name System (DNS) resolver, the computer-implemented method comprising: determining options available for reducing data transfer between the DNS resolver and a DNS nameserver; and using at least two of the options to reduce the data transfer between the DNS resolver and the DNS nameserver.

Embodiment C.2. An apparatus for use by a Domain Name System (DNS) resolver, the apparatus comprising one or more processors and one or more non-transitory computer-readable media storing instructions that, when executed by the one or more processors, cause the apparatus to perform operations comprising: determining options available for reducing data transfer between the DNS resolver and a DNS nameserver; and using at least two of the options to reduce the data transfer between the DNS resolver and the DNS nameserver.

Embodiment C.3. A system for use by a Domain Name System (DNS) resolver, the system comprising one or more processors and one or more non-transitory computer-readable media storing instructions that, when executed by the one or more processors, cause the one or more processors to perform operations comprising: determining options available for reducing data transfer between the DNS resolver and a DNS nameserver; and using at least two of the options to reduce the data transfer between the DNS resolver and the DNS nameserver.

Embodiment C.4. One or more non-transitory computer-readable media for use by a Domain Name System (DNS) resolver, the one or more non-transitory computer-readable storing instructions that, when executed by one or more processors, cause the performance of operations comprising: determining options available for reducing data transfer between the DNS resolver and a DNS nameserver; and using at least two of the options to reduce the data transfer between the DNS resolver and the DNS nameserver.

The embodiments C.1, C.2, C.3, C.4 may have one or more of the following in any combination unless clearly mutually exclusive: Feature 1: at least one of the options comprises abstaining from a data transfer of current data when an identifier that the DNS resolver associates with cache data corresponds to an identifier that the DNS nameserver associates with the current data. Feature 2: at least one of the options comprises requesting data using a granular request, wherein the granular request requests a portion of the data comprising less than a full resource record (RR) set. Feature 3: at least one of the options comprises obtaining data via an out-of-band transfer between the DNS resolver and an out-of-band source distinct from the DNS nameserver. Feature 4: sending the DNS nameserver information indicating the options supported by the DNS resolver: wherein the at least two of the options used to reduce the data transfer between the DNS resolver and the DNS nameserver are selected by the DNS nameserver based on the information indicating the options supported by the DNS resolver. Feature 5: the information indicating the options supported by the DNS resolver further indicates a prioritization of the options.

Embodiment D.1 A computer-implemented method for use by a Domain Name System (DNS) nameserver, the computer-implemented method comprising: determining options available for reducing data transfer between the DNS nameserver and a DNS resolver; and using at least two of the options to reduce the data transfer between the DNS nameserver and the DNS resolver.

Embodiment D.2. An apparatus for use by a Domain Name System (DNS) nameserver, the apparatus comprising one or more processors and one or more non-transitory computer-readable media storing instructions that, when executed by the one or more processors, cause the apparatus to perform operations comprising: determining options available for reducing data transfer between the DNS nameserver and a DNS resolver; and using at least two of the options to reduce the data transfer between the DNS nameserver and the DNS resolver.

Embodiment D.3. A system for use by a Domain Name System (DNS) nameserver, the system comprising one or more processors and one or more non-transitory computer-readable media storing instructions that, when executed by the one or more processors, cause the one or more processors to perform operations comprising: determining options available for reducing data transfer between the DNS nameserver and a DNS resolver; and using at least two of the options to reduce the data transfer between the DNS nameserver and the DNS resolver.

Embodiment D.4. One or more non-transitory computer-readable media for use by a Domain Name System (DNS) nameserver, the one or more non-transitory computer-read-able media for storing instructions that, when executed by one or more processors, cause the performance of operations comprising: determining options available for reducing data transfer between the DNS nameserver and a DNS resolver; and using at least two of the options to reduce the data transfer between the DNS nameserver and the DNS resolver.

The embodiments D.1, D.2, D.3, D.4 may have one or more of the following in any combination unless clearly mutually exclusive: Feature 1: at least one of the options comprises abstaining from a data transfer of current data when an identifier that the DNS resolver associates with cache data corresponds to an identifier that the DNS nameserver associates with the current data. Feature 2: at least one of the options comprises receiving a granular request for data, wherein the granular request requests a portion of the data comprising less than a full resource record (RR) set, and providing a response comprising the portion of data indicated in the granular request. Feature 3: at least one of the options comprises indicating to the DNS resolver to obtain data via an out-of-band transfer between the DNS resolver and an out-of-band source distinct from the DNS nameserver. Feature 4: receiving, from the DNS resolver, information indicating the options supported by the DNS resolver; and selecting the at least two of the options used to reduce the data transfer between the DNS resolver and the DNS nameserver based on the information indicating the options supported by the DNS resolver. Feature 5: the information indicating the options supported by the DNS resolver further indicates a prioritization of the options; and selecting the at least two of the options used to reduce the data transfer between the DNS resolver and the DNS nameserver is based at least in part on the prioritization of the options.

What is claimed is:

1. A computer-implemented method for use by a Domain Name System (DNS) nameserver, the computer-implemented method comprising:

obtaining a first identifier that the DNS nameserver associates with current data, the current data comprising at least a portion of one or more DNS resource records;

receiving or obtaining a second identifier that a DNS recursive resolver associates with cache data;

determining whether the first identifier corresponds to the second identifier; and sending, from the DNS nameserver to the DNS recursive resolver, an indication to maintain the cache data in response to determining that the first identifier corresponds to the second identifier.

2. The computer-implemented method of claim 1, wherein the indication indicates to increase a time-to-live associated with the cache data.

3. The computer-implemented method of claim 1, wherein, when the first identifier does not correspond to the second identifier:

sending, to the DNS recursive resolver, an indication to update the cache data; and sending, to the DNS recursive resolver, at least a portion of the current data or a reference to at least a portion of the current data.

4. The computer-implemented method of claim 1, determining the first identifier does not correspond to the second identifier:

sending, to the DNS recursive resolver, an indication to update the cache data; and sending, to the DNS recursive resolver, at least a portion of the current data, wherein the at least a portion of the current data is sent via a connectionless protocol.

5. The computer-implemented method of claim 4, wherein the connectionless protocol is User Datagram Protocol (UDP).

6. The computer-implemented method of claim 1, wherein determining whether the first identifier corresponds to the second identifier is in response to a timer expiry.

7. The computer-implemented method of claim 1, wherein determining whether the first identifier corresponds to the second identifier is in response to a request from the DNS recursive resolver.

8. The computer-implemented method of claim 1, wherein determining that the first identifier corresponds to the second identifier indicates that the current data corresponds to the cache data.

9. The computer-implemented method of claim 1, wherein the at least a portion of the one or more DNS resource records comprises information used for DNS Security Extensions (DNSSEC) validation.

10. The computer-implemented method of claim 9, wherein the information used for DNSSEC validation comprises a key or a signature.

11. The computer-implemented method of claim 1, wherein obtaining the first identifier comprises retrieving the first identifier from memory of the DNS nameserver.

12. The computer-implemented method of claim 1, wherein obtaining the first identifier comprises dynamically calculating the first identifier by the DNS nameserver.

13. The computer-implemented method of claim 1, wherein the first identifier is derived from the current data and the second identifier is derived from the cache data.

14. The computer-implemented method of claim 1, wherein the first identifier comprises a hash of the current data and the second identifier comprises a hash of the cache data.

15. The computer-implemented method of claim 1, wherein the first identifier comprises a subset of a hash of the current data and the second identifier comprises a subset of a hash of the cache data.

16. The computer-implemented method of claim 1, wherein the first identifier comprises a subset of the current data and the second identifier comprises a subset of the cache data.

17. The computer-implemented method of claim 1, wherein the first identifier and the second identifier are each managed by the DNS nameserver, wherein the first identifier is bound to the current data and the second identifier is bound to the cache data.

18. The computer-implemented method of claim 17, wherein the DNS nameserver is configured to validate that the first identifier is for the current data, and the DNS nameserver is configured to validate that the second identifier is for the cache data.

19. The computer-implemented method of claim 1, wherein the first identifier is a first verifiable instance identifier (VIID) and the second identifier is a second VIID.

20. The computer-implemented method of claim 19, wherein
the first VIID and the second VIID are verifiably associated with data instances.

21. The computer-implemented method of claim 19, wherein the first VIID and the second VIID are labeled as label VIIDs, wherein the label VIID is a unique identifier assigned to a data instance by an authoritative source.

22. The computer-implemented method of claim 19, wherein the first VIID and the second VIID are not cryptographically derived.

23. The computer-implemented method of claim 1, the computer-implemented method further comprising:
receiving a request for at least a portion of the current data from the DNS recursive resolver; and
facilitating out-of-band transfer of the at least a portion of the current data to the DNS recursive resolver.

24. The computer-implemented method of claim 23, wherein facilitating the out-of-band transfer of the at least a portion of the current data is based at least in part on determining that a size of the at least a portion of the current data exceeds a threshold.

25. The computer-implemented method of claim 23, wherein facilitating the out-of-band transfer of the at least a portion of the current data comprises indicating, to the DNS recursive resolver, a reference to an out-of-band source from which to retrieve at least a portion of the current data.

26. The computer-implemented method of claim 1, wherein the first identifier comprises a reference to an out-of-band data source from which to receive at least a portion of the current data.

27. The computer-implemented method of claim 1, the computer-implemented method further comprising:
receiving a granular request for data from a DNS recursive resolver, the granular request requesting a portion of the current data comprising less than a full resource record (RR) set; and
sending, to the DNS recursive resolver, the portion of the current data or a reference to an out-of-band source from which to retrieve the portion of the current data.

28. The computer-implemented method of claim 27, wherein the granular request indicates one or more requested RRs selected from the full RR set.

29. The computer-implemented method of claim 27, wherein the granular request indicates one or more requested elements of one or more RRs selected from the full RR set.

30. The computer-implemented method of claim 1, wherein the second identifier is received from the DNS recursive resolver.

31. The computer-implemented method of claim 1, wherein the current data comprises authoritative data instances, and the cached data comprises cached data instances.

32. An apparatus for use by a Domain Name System (DNS) nameserver, the apparatus comprising one or more processors and one or more non-transitory computer-readable media storing instructions that, when executed by the one or more processors, cause the apparatus to perform operations comprising:
obtaining a first identifier that the DNS nameserver associates with current data, the current data comprising at least a portion of one or more DNS resource records;
receiving or obtaining a second identifier that a DNS recursive resolver associates with cache data;
determining whether the first identifier corresponds to the second identifier; and
sending, from the DNS nameserver to the DNS recursive resolver, an indication to maintain the cache data in response to determining that the first identifier corresponds to the second identifier.

33. A system for use by a Domain Name System (DNS) nameserver, the system comprising one or more processors and one or more non-transitory computer-readable media storing instructions that, when executed by the one or more processors, cause the one or more processors to perform operations comprising:

obtaining a first identifier that the DNS nameserver associates with current data, the current data comprising at least a portion of one or more DNS resource records;

receiving or obtaining a second identifier that a DNS recursive resolver associates with cache data;

determining whether the first identifier corresponds to the second identifier; and sending, from the DNS nameserver to the DNS recursive resolver, an indication to maintain the cache data in response to determining that the first identifier corresponds to the second identifier.

34. One or more non-transitory computer-readable media for use by a Domain Name System (DNS) nameserver, the one or more non-transitory computer-readable media storing instructions that, when executed by one or more processors, cause the performance of operations comprising:

obtaining a first identifier that the DNS nameserver associates with current data, the current data comprising at least a portion of one or more DNS resource records;

receiving or obtaining a second identifier that a DNS recursive resolver associates with cache data;

determining whether the first identifier corresponds to the second identifier; and sending, from the DNS nameserver to the DNS recursive resolver, an indication to maintain the cache data in response to determining that the first identifier corresponds to the second identifier.

* * * * *